(12) United States Patent
Szirmay-Kalos et al.

(10) Patent No.: US 9,189,870 B2
(45) Date of Patent: Nov. 17, 2015

(54) METHOD, COMPUTER READABLE MEDIUM AND SYSTEM FOR TOMOGRAPHIC RECONSTRUCTION

(75) Inventors: Laszlo Szirmay-Kalos, Budapest (HU); Milan Magdics, Budapest (HU); Balazs Gyorgy Toth, Budapest (HU)

(73) Assignee: Mediso Orvosi Berendezes Fejleszto es Szerviz Kft., Budapest (HU)

( * ) Notice: Subject to any disclaimer, the term of this patent is extended or adjusted under 35 U.S.C. 154(b) by 0 days.

(21) Appl. No.: 14/416,533

(22) PCT Filed: Jul. 23, 2012

(86) PCT No.: PCT/HU2012/000066
§ 371 (c)(1),
(2), (4) Date: Jan. 22, 2015

(87) PCT Pub. No.: WO2014/016626
PCT Pub. Date: Jan. 30, 2014

(65) Prior Publication Data
US 2015/0213630 A1      Jul. 30, 2015

(51) Int. Cl.
*G06K 9/00* (2006.01)
*G06T 11/00* (2006.01)
(Continued)

(52) U.S. Cl.
CPC ............... *G06T 11/005* (2013.01); *G06T 1/20* (2013.01); *G06T 11/006* (2013.01); *G06T 2207/10104* (2013.01); *G06T 2210/41* (2013.01); *G06T 2210/52* (2013.01); *G06T 2211/416* (2013.01);
(Continued)

(58) Field of Classification Search
CPC ....................................................... G06T 11/00

USPC ......... 382/128, 129, 130, 131, 132, 133, 134; 378/4, 8, 21–27, 101, 901; 600/407, 600/410, 411, 425, 427
See application file for complete search history.

(56) References Cited

U.S. PATENT DOCUMENTS 7,840,053 B2 * 11/2010 Liao .................... G01N 23/046
378/4

OTHER PUBLICATIONS

Milan Magdics et al, TeraTomo project: a fully 3D GPU based reconstruction code for exploiting the imaging capability of the NanoPET/CT system, 2010 World Molecular Imaging Congress, Sep. 11, 2010.
Milan Magdics et al, Detector Modeling Techniques for Pre-Clinical 3D PET Reconstruction on the GPU, Proceedings of the 11th International Meeting on Fully 3D Image Reconstruction in Radiology and Nuclear Medicine, Jul. 11, 2011.
L. Szipmay-Kalos et al, Gamma Photon Transport on the GPU for PET, Jun. 4, 2009, Large-Scale Scientific Computing, Springer Berlin Heidelberg, Berlin, Heidelberg.
(Continued)

*Primary Examiner* — Abolfazl Tabatabai
(74) *Attorney, Agent, or Firm* — Wood, Herron & Evans, LLP

(57) ABSTRACT

The invention is a method for emission tomographic reconstruction from measurement data, the method comprising the steps of: obtaining the measurement data corresponding to activity of particle emissions of a volume from a tomographic imaging system, and performing at least one iteration step to obtain emission density data of particle emissions of the volume from the measurement data, wherein the at least one iteration step comprises a forward projection being a projection from the emission density data to the measurement data, and a back projection being a projection from the measurement data to the emission density data, and the at least one iteration step is carried out in a parallel hardware architecture, wherein both the forward projection and the back projection are of at least partially gathering type, and the measurement data is of binned type. The invention also relates to computer readable medium and a system for processing tomographic reconstruction from measurement data.

20 Claims, 14 Drawing Sheets

(51) Int. Cl.
*G06T 1/20* (2006.01)
*A61B 6/00* (2006.01)
(52) U.S. Cl.
CPC ..... *G06T 2211/424* (2013.01); *G06T 2211/428* (2013.01)

(56) References Cited

OTHER PUBLICATIONS

European Patent Office, International Search Report and Written Opinion of the International Searching Authority, Mar. 21, 2013.

\* cited by examiner

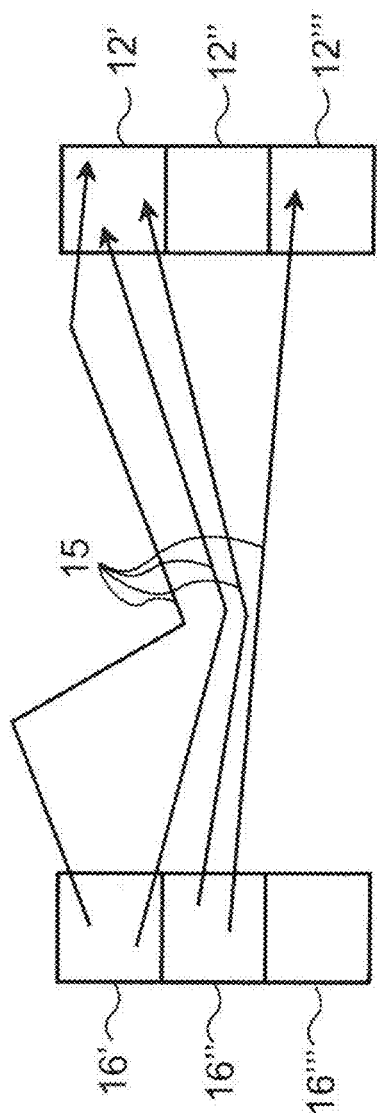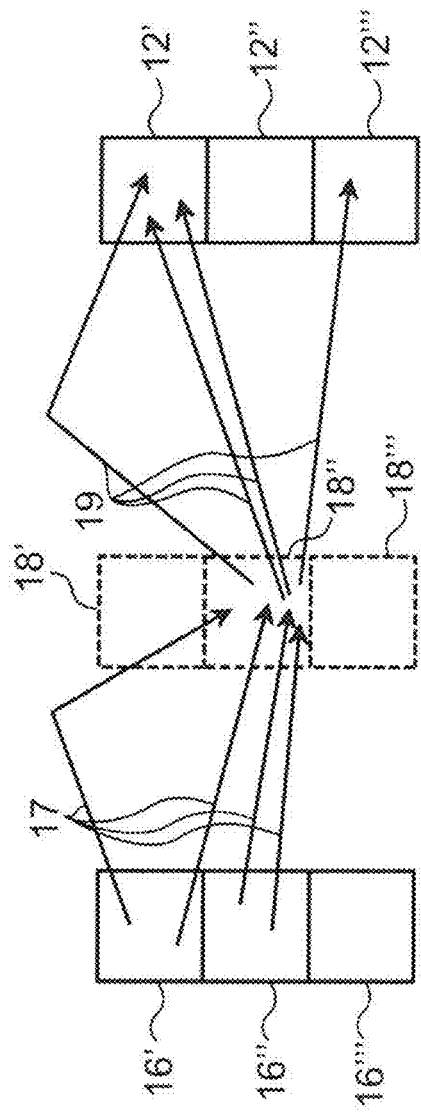

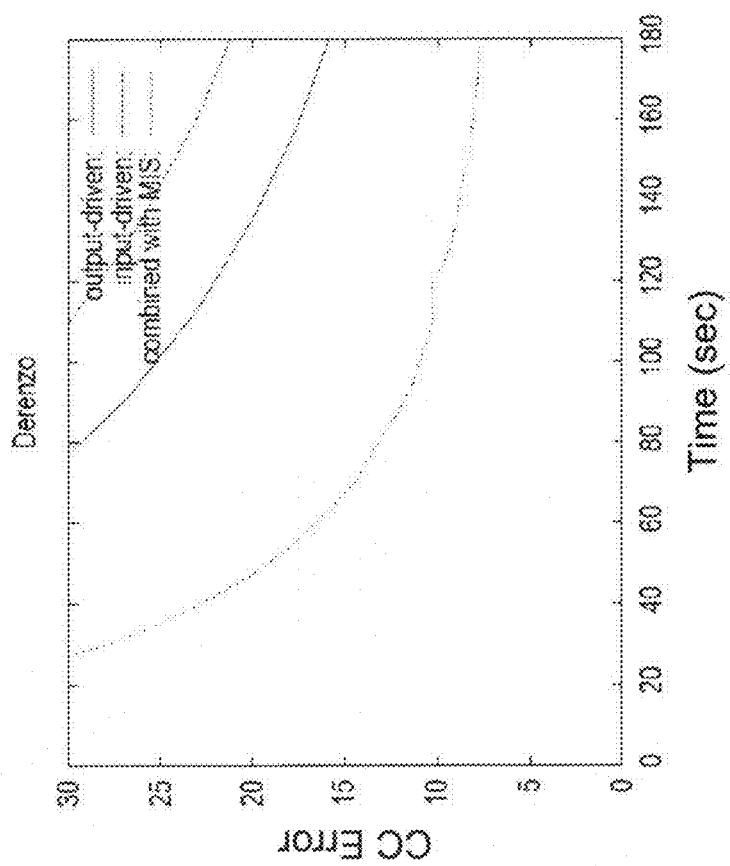

METHOD, COMPUTER READABLE MEDIUM AND SYSTEM FOR TOMOGRAPHIC RECONSTRUCTION

This application claims priority, under Section 371 and/or as a continuation under Section 120, to PCT Application No. PCT/HU2012/000066, filed on Jul. 23, 2012.

TECHNICAL FIELD

The invention relates to a method, a computer readable medium and a system for tomographic reconstruction from measurement data.

BACKGROUND ART

In emission tomography the density data of particle emissions (in the following: emission density data) in a volume has to be found on the basis of measurement data. Emitting particles are for instance positrons or gamma photons. Emitted particles may get scattered or get absorbed, and may also change their type in the volume or before detection. Emitted particles or the particles originating from the emitted particles arrive in detector devices that report detection events. The above mentioned physical phenomena complicate the tomographic reconstruction, and for an appropriate result these have to be taken into account in the course of the reconstruction. An emission tomographic reconstruction method reconstructs the emission density data based on the measurement data obtained from signals of detector devices comprising a plurality of detector elements.

In Positron Emission Tomography (PET) the density of radioactive tracer materials has to be found, which is proportional with its emission density data. In the case of PET, the particles emitted from the tracer material are positrons, which are replaced by pairs of approximately oppositely directed gamma photons when they annihilate with electrons (cf. Physics reference manual, Geant4 9.1. Technical Report, CERN, 2007). These gamma photons may get scattered in the body and/or in the detector elements before they get finally absorbed in a detector element comprised in the detector device or module. The detector elements are usually in the form of detector crystals. In PET the detector device should detect pairs of gamma photons arriving almost simultaneously, so an event occurs if two detector elements nearly simultaneously detect two photons. This means that in PET, a pair of detector elements, sometimes called detector crystals, represents a conceptual detector, which is also called Line Of Response (LOR).

In Single Photon Emission Tomography (SPECT), emitted particles are gamma photons. A particle may also get scattered or absorbed in the object, in the collimator or in the detector crystals comprised in a detector device rotating around the object to be investigated. A detector crystal—i.e. a detector element—is able to detect gamma photons that went through a collimator associated to it. The collimator can be for example parallel hole, pinhole, multi-pinhole, fan or cone beam, slit-slat type or any other type. Thus in SPECT, a conceptual detector is defined by the actual orientation of the detector device, i.e. of its detector elements and the corresponding collimators. The line characterizing this orientation is called the projection line.

Two main types of the reconstruction methods are known. If the emission density is reconstructed only from the number of events per conceptual detector, then the reconstruction process is said to be based on binned data. In a binned type reconstruction the inputs comprise the total number of hits in conceptual detectors acquired during the measurement. Consequently, when binned reconstruction is applied, individual detector events undergo binning and the emission density data has to be reconstructed from the spatial histogram of photon pair hits in the case of PET or from the photon hits in the case of SPECT.

However, if the reconstruction method considers events one-by-one in their order, then the reconstruction is of a list mode. A list mode reconstruction may involve more information, like the timing of individual events. The differences between binned and list mode reconstruction are given in more detail below.

The required output of a reconstruction method of any type is the emission density function $x(\vec{v})$ in points $\vec{v}$ of a volume of interest $\square$, which is typically discretized on a voxel grid. In the case of binned reconstruction the input of the reconstruction method is the measurement data, the measured number of hits in the conceptual detectors, which is connected to the output by a system matrix. An element of the system matrix represents the probability that a particle generated in a voxel is detected by a conceptual detector.

For typical systems, both the number of conceptual detectors and the number of voxels may be in the range of several hundred millions, thus the system matrix has a very large size and the reconstruction method must scale up well and must be appropriate for high performance computation platforms. The known time-consuming processes of iterative tomography reconstruction are targeted by pre-computing system dependent information and always needed more efficient computational platforms (A. J. Reader and H. Zaidi: Advances in PET Image Reconstruction, *PET Clinics*, Vol. 2, pp. 173-190 (2007)).

Using a pre-computed (U.S. Pat. No. 7,332,721 B2, S. Moehrs, M. Defrise, N. Belcari, A Del Guerra, A. Bartoli, S. Fabbri, and G. Zanetti: Multi-ray-based system matrix generation for 3D PET reconstruction, *Phys. Med. Biol.*, Vol. 53, pp. 6925-6945 (2008) and J. Qi, R. M. Leahy, S. R. Cherry, A. Chatziioannou, and T. H. Farquhar: High-resolution 3D Bayesian image reconstruction using the microPET small-animal scanner. *Physics in Medicine and Biology*, Vol. 43, pp. 1001-1013 (1998)) or a measured (V. Y. Panin, F. Kehren, C. Michel, and M. Casey: Fully 3-D PET reconstruction with system matrix derived from point source measurements, *IEEE Transactions on Medical Imaging*, Vol. 25, pp. 907-921 (2006)) system matrix seems to be an attractive option, but in high resolution real three-dimensional scanners this would pose prohibitive memory requirements disadvantageously, even if the matrix is compressed, decomposed as a product of a series of smaller matrices (J. Qi, R. M. Leahy, S. R. Cherry. A. Chatziioannou, and T. H. Farquhar: High-resolution 3D Bayesian image reconstruction using the microPET small-animal scanner, *Physics in Medicine and Biology*, Vol. 43, pp. 1001-1013 (1998)), or symmetry is exploited (J. L. Herraiz. S. Espaa. S. Garcia, R. Cabido, A. S. Montemayor, M. Desco, J. J. Vaquero, and J. M. Udias: GPU acceleration of a fully 3D iterative reconstruction software for PET using CUDA, in: *Nuclear Science Symposium Conference Record (NSS/MIC)*, 2009 *IEEE*, pp. 4064-4067 (2009)). On the other hand, in case of a pre-computed or measured system matrix, phenomena like object and material dependent positron range, absorption or scattering cannot be considered, disadvantageously.

Among the high-performance computing possibilities, like Field-Programmable Gate Arrays (FPGA) (M. Leeser, S. Coric, E. Miller, H. Yu, and M. Trepanier: Parallel-beam back projection: an FPGA implementation optimized for medical imaging, in: *Proc. Tenth Int. Symposium on FPGA*, pp. 217-

226 (2002) and US 2008/0095300 A1), multi-CPU systems (D. W. Shattuck, J. Rapela, E. Asma, A. Chatzioannou, J. Qi, and R. M. Leahy: Internet2-based 3D PET image reconstruction using a PC cluster, *Physics in Medicine and Biology*, Vol. 47, pp. 2785-2795 (2002)), cell processors (M. Kacheiries, M. Knaup, and O. Bockenbach: Hyperfast parallel-beam and conebeam back projection using the CELL general purpose hardware, *Medical Physics*, Vol. 34. pp. 1474-1486 (2007)), and GPUs (Graphics Processing Units) (F. Xu and K. Mueller: Real-time 3D computed tomographic reconstruction using commodity graphics hardware, *Physics in Medicine and Biology*, pp. 3405-3419 (2007)), in a comparison to other architectures, the massively parallel GPU has proven to be the most cost-effective platform for tomographic reconstruction tasks (N. Gac, S. Mancini, M. Desvignes, and D. Houzet: High speed 3D tomography on CPU, GPU, and FPGA, *EURASIP Journal on Embedded Systems*, Article ID 930250 (2008)).

GPUs can be programmed with two different programming models. Shader APIs (Application Programming Interface) present the GPU hardware as the direct implementation of the incremental rendering pipeline (L. Szirmay-Kalos, L. Szcsi. M. Sbert: GPU-Based Techniques for Global Illumination Effects, Morgan and Claypool Publishers, San Rafael, USA (2008)), including both programmable and fixed processing stages. On the other hand, GPGPU (General Purpose GPU) APIs like CUDA (Compute Unified Device Architecture) (NVIDIA, http://developer.nvidia.com/cuda, in: The CUDA Homepage) and OpenCL (Open Computing Language) provide access to the multiprocessors of the GPU where each multiprocessor contains a set of scalar processors sharing the instruction unit, and therefore acting as a SIMD (Single Instruction. Multiple Data) hardware. If only the geometric projection is considered in a tomographic reconstruction, then the shader API implementation is more appropriate since rasterizer and alpha-blending units accessible only through the shader API support these simple calculations (B. Bai, A. Smith: Fast 3D iterative reconstruction of PET images using PC graphics hardware, in: IEEE Nuclear Science Symposium, pp. 2787-2790 (2006); F. Xu and K. Mueller: Real-time 3D computed tomographic reconstruction using commodity graphics hardware, *Physics in Medicine and Biology*, pp. 3405-3419 (2007); G. Pratx, C. Chinn, P. D. Olcott, C. S. Levin: Fast, accurate and shift-varying line projections for iterative reconstruction using the GPU, *IEEE Trans. on Medical Imaging*, Vol. 28, pp. 435-445 (2009)). A tomographic imaging technique for GPU is described in F. Xu and K. Mueller: GPU-Acceleration of Attenuation and Scattering Compensation in Emission Computed Tomography, in: *9th Fully Three-Dimensional Image Reconstruction in Radiology and Nuclear Medicine* '07 (2007). However, when an algorithm gets more complex, the incremental rendering pipeline view of the shader API becomes too restrictive and less intuitive (G. Pratx, L. Xing: GPU computing in medical physics: A review, *Med. Phys.*, Vol. 38, pp. 2685-2698 (2011)), and GPGPU APIs become the better choice for such tasks. The critical issue of the GPGPU programming is thread mapping, i.e. the decomposition of the algorithm to parallel threads that can run efficiently. For example, while simulating particle transport, it is intuitive to mimic how nature works in parallel, and assign parallel computational threads, for example, to randomly generated photon paths (A. Wirth, A. Cserkaszky, B. Kári, D. Légrády, S. Fehér, S. Czifrus, B. Domonkos: Implementation of 3D Monte Carlo PET reconstruction algorithm on GPU, in: *Nuclear Science Symposium Conference Record (NSS/MIC), IEEE*, pp. 4106-4109 (2009)). However, while significant speed ups can be obtained with respect to a CPU implementation, this somehow natural thread mapping cannot exploit the full potential of GPUs.

In an iterative tomographic reconstruction, forward projection computing the expected detector hits from an actual estimation on emission density data and back projection correcting the emission density data based on the measured and expected detector responses, alternate. Equations of forward projection and back projection are similar in the way that they take many input values—voxel intensities and data of conceptual detectors, respectively—and compute many unknown values—again, data of conceptual detectors and voxel intensities, respectively. This kind of "many to many" computation can be organized in two different ways. Known values can be taken one-by-one obtaining the contribution of a single known value to all of the unknowns, and accumulate the contributions as the different known values are visited. This scheme is called scattering. The opposite—sometimes called orthogonal—approach takes unknown values one-by-one, and obtains the contribution of all known values to this particular unknown value. This approach is called gathering. Generally, input-driven algorithms are of scattering type, while output-driven ones are of gathering type.

A list mode PET reconstruction using GPU architecture is described in US 2011/0182491 A1 and further detailed in a paper (J. Cui, G. Pratx, S. Prevrhal, C. S. Levin: Fully 3D list-mode time-of-flight PET image reconstruction on GPUs using CUDA, *Med. Phys.*, Vol. 38, No. 12 (2011)). These documents state that for a reconstruction using a GPU it is worth if both the forward projection and the back projection is of gathering type. However, the back projection detailed in the documents is of scattering type.

In U.S. Pat. No. 7,778,392 B1 such a computer tomography reconstruction method is described, where the back projection is optimized for GPU architecture. In U.S. Pat. No. 7,876,944 B2 a medical image reconstruction method is described, where a GPU-optimized back projection step is applied.

In U.S. Pat. No. 6,804,325 B1 such a reconstruction method is described, where the end points of the LORs are randomly distributed on the surface of a detector element. In US 2007/0201611 A1 such a PET reconstruction method for a GPU is described, in which tri-linear interpolation is used. In U.S. Pat. No. 7,333,107 B2 a gather-scatter approach is detailed in connection with the forward- and back projection, and the reuse of an already computed data is described for a GPU. In U.S. Pat. No. 7,120,283 B2, US 2010/0266178 A1, U.S. Pat. No. 7,873,236 B2 and US 2011/0051893 A1 medical image processing methods are described for a GPU. In US 2010/0128046 A1 Poisson-disk distribution is used for sampling in a GPU architecture.

Unmatching forward and back projection is described for tomographic reconstruction in G. Zeng, G. Gullberg: Unmatched projector/backprojector pairs in an iterative reconstruction algorithm, *IEEE Transactions on Medical Imaging*, Vol. 19, pp. 548-555 (2000); R. Guedouar, B. Zarrad: A comparative study between matched and mismatched projection/back projection pairs used with ASIRT reconstruction method, *Nuclear Instruments and Methods in Physics Research*, Vol. 619, pp. 225-229 (2010); V.-G. Nguyen, S.-J. Lee, M. N. Lee: GPU-accelerated 3D Bayesian image reconstruction from Compton scattered data, *Physics in Medicine and Biology*, Vol. 56. pp. 2817 (2011); and N.-Y. Lee, Y. Choi: Theoretical investigation on an unmatched backprojector for iterative reconstruction in emission computed tomography, *Journal of the Korean Physical Society*, Vol. 59, pp. 367-375 (2011).

In US 2008/0095300 A1, U.S. Pat. Nos. 7,769,217 B2 and 8,000,513 B2 it is described that the forward projection and the back projection are advantageously matching algorithms. It is described in U.S. Pat. No. 7,856,129 B2 that the method detailed therein can be generalized to unmatching projections. In U.S. Pat. Nos. 5,414,623 and 7,596,202 B2 such methods are described, where a filtering is applied between forward and back projection.

In US 2011/0164799 A1 and US 2011/0194747 A1 such methods are described where filtering is applied for the reconstruction data in the Fourier space.

In U.S. Pat. Nos. 7,381,960 B1, 7,759,647 B2 and 7,835,782 B2 the problem of positron propagation before annihilation is detailed. In U.S. Pat. No. 7,835,782 B2 a scheme for handling this problem is described. In U.S. Pat. No. 7,923,690 B2 and US 2011/0248765 A1 it is described that the problem of the positron propagation is not handled.

Tomographic systems are described in U.S. Pat. Nos. 6,373,059 B1, 7,211,799 B2, US 2010/0108896 A1 and US 2011/0127434 A1, in which the different sensitivities of the detector elements on the detection of an event are taken into account. In US 2007/0221855 A1 and WO 2011/036436 A1 the photon transport through adjacent detector elements is handled.

In U.S. Pat. Nos. 7,015,477 B2, 7,332,721 B2, 7,876,941 B2, US 2011/0044546 A1, US 2011/0164031 A1 and U.S. Pat. No. 7,983,465 B2 the possible solutions of the equations of forward- and/or back projection are described.

A tomographic reconstruction method is disclosed in M. Magdics, L. Szirmay-Kalos, Á. Szlavecz, G. Hesz, B. Benyó, Á. Cserkaszky, J. Lantos, D. Légrády, Sz. Czifrus, A. Wirth, B. Kári, G. Patay, D. Völgyes, T. Bükki, P. Major, G. Németh, B. Domonkos: TeraTomo project: a fully 3D GPU based reconstruction code for exploiting the imaging capability of the NanoPET/CT system, 2010 *World Molecular Imaging Congress*, 11 Sep. 2010. This paper discusses direct Monte Carlo particle transport and presents an adjoint Monte Carlo method which applies gathering type approach both in forward and back projection. Both direct photon hits and scattered photon hits are considered.

Several methods for handling gamma photon scattering in the detector modules are disclosed in M. Magdics, B. Tóth, L. Szécsi, B. Csébfalvi, L. Szirmay-Kalos, Á. Szlavecz, G. Hesz, B. Benyó, Á. Cserkaszky, D. Légrády. Sz. Czifrus, A. Wirth, B. Kári, J. Lantos, G. Patay, D. Völgyes, P. Major. G. Németh, T. Bükki, B. Domonkos: Detector Modelling Techniques for Pre-Clinical 3D PET Reconstruction on the GPU, *Proceedings of the 11th International Meeting on Fully 3D Image Reconstruction in Radiology and Nuclear Medicine*, 11 Jul. 2011, pp. 375-378.

A photon transport simulation method, that executes the very same instruction in parallel threads at a time and eliminates the conditional instructions, is disclosed in L. Szirmay-Kalos, B. Tóth, M. Magdics, D. Légrády, and A. Penzov: Gamma Photon Transport on the GPU for PET, in: *Large-scale scientific computing*, Springer Berlin, Heidelberg, pp. 435-442, 4 Jun. 2009.

It is a disadvantage of many of the prior art solutions that the level of optimization of the reconstruction methods used for the parallel architectures is not high enough.

DESCRIPTION OF THE INVENTION

In view of the known solutions there is a need for providing a tomographic reconstruction method which can achieve as high accuracy and low reconstruction time as possible, i.e. near real-time reconstruction.

Therefore, an object of the invention is to provide an emission tomographic reconstruction method, which is free of the disadvantages of prior art solutions.

It is another object of the invention to provide an emission tomographic reconstruction method which can achieve as high accuracy and low reconstruction time as possible, i.e. which maximizes the accuracy of the system matrix estimation with a relatively small number of samples.

A further object of the invention is to provide an emission tomographic reconstruction method which is highly optimized for parallel architectures.

The object of an embodiment of the invention is to get an algorithm that is accurate for all types of data, i.e. applicable either for homogeneous regions or small, high intensity regions to be reconstructed and is fast on the target parallel architecture.

The objects of the invention can be achieved by the emission tomographic reconstruction method according to claim 1, by the computer readable medium according to claim 14 and the system according to claim 15. Preferred embodiments are defined in the dependent claims.

The main difference between the prior art solutions and the method according to the invention is that the prior art solutions which are more or less optimized for parallel architectures, described e.g. in US 2011/0182491 A1, utilize list mode reconstruction unlike the invention targeting binned mode reconstruction.

List mode reconstruction processes a list of individual events, thus event specific information can be assigned to each detector hit, like photon energy or the time difference of detections (time of flight). Binned mode reconstruction, on the other hand, works with accumulated data, which comprise the number of hits in each conceptual detector and, optionally in the case of time of flight measurements, associated histograms of energy levels of time of flight measurements. A binned mode reconstruction, therefore, in spite of dropping out the additional information handled in a list mode reconstruction, can be appropriate for fast reconstructions. In the binned mode reconstruction method according to the invention, on the top of the fast reconstruction, high accuracy can be reached by careful implementation as detailed below.

As list mode processes events one-by-one, it cannot reuse computation done previously when another event in the same conceptual detector was processed. Unlike the list mode reconstruction, the reuse of previously done computations can be applied in binned mode reconstruction. To make this reuse even more effective, the invention proposes the application of factoring in some embodiments, which improves the performance of binned mode reconstruction and would not be feasible in a list mode approach.

Finally, as binned mode reconstruction uses all data in an accumulated form, the complete reconstruction problem can be considered both from the point of view of conceptual detectors and from the voxels. Thus, there is the option of developing both conceptual detector driven and voxel driven algorithms in forward and back projection, respectively, where the signal of the detector elements and the emission density data corresponding to voxel values are the respective outputs. This is crucial when the algorithm is designed for parallel implementation where generally output-driven algorithms should be preferred. However, in a data element of list mode, a conceptual detector and several voxels as possible sources are involved. Even if events of the list are grouped, there are still just a subset of conceptual detectors and possible source voxels that could cause these events compared to the binned mode reconstruction. As the possible source voxels are determined by the conceptual detectors of the subset, the processing algorithm must necessarily be conceptual detector driven. A voxel driven approach is not feasible in the case of the list mode reconstruction since it would consider all conceptual detectors, so the remaining advantages of list mode processing would be lost. This is exactly why both forward projection and back projection are LOR-driven in US 2011/0182491 A1.

A further difference between the prior art solutions and some embodiments of the method according to the invention is that the prior art solutions involve either gathering type approaches, which are good for GPU implementation but cannot focus on important, i.e. high contribution subsets of the data, or scattering type approaches, which may reconstruct well important regions but perform poorly on the GPU. In contrast, the invention combines the advantages of scattering and gathering approaches with the application of multiple importance sampling. In addition, unlike US 2011/0182491 A1 that addresses list mode reconstruction with gather-only forward projection and scatter-only back projection, some embodiments of the invention target binned mode reconstruction with combined forward and combined back projections.

In the view of the above detailed reasons, the invention is based on the recognition that a binned type reconstruction method can be more thoroughly optimized on parallel architectures than a list mode reconstruction method.

BRIEF DESCRIPTION OF DRAWINGS

Preferred embodiments of the invention will now be described by way of example with reference to drawings, in which:

FIG. 2A shows an exemplary ray bundle between sources and detector devices,

FIG. 2B shows the exemplary ray bundle with introducing a virtual detector device/virtual source in between the sources and detector devices, FIGS. 13A-13C show comparison of various embodiments of the invention for point phantom, homogeneity phantom and Derenzo phantom.

MODES FOR CARRYING OUT THE INVENTION

Figure 1:
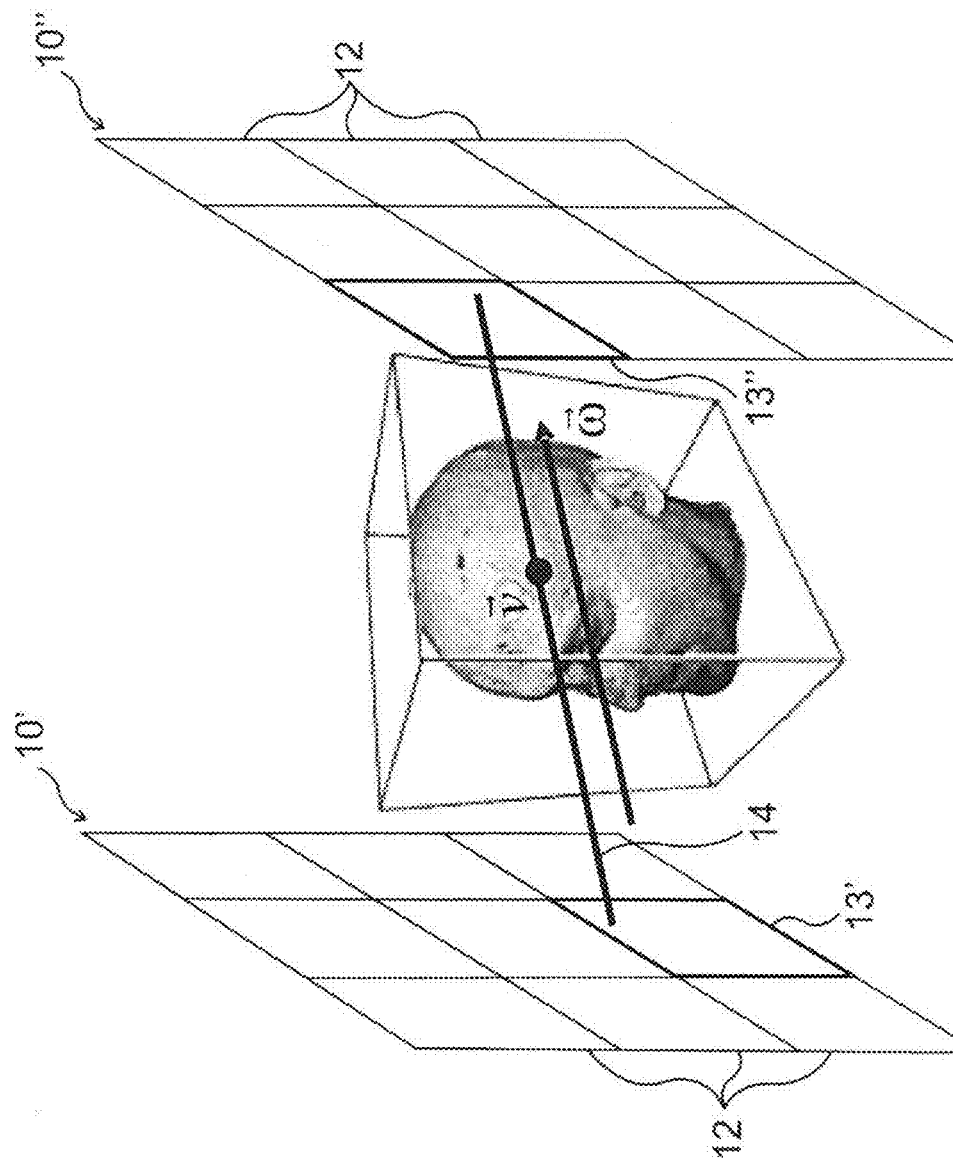
FIG. 1 shows a volume of interest placed between two parallel detector devices.

The emission tomographic reconstruction method according to the invention is carried out in a parallel architecture. In the following, such embodiments of the inventive method are detailed mainly where the parallel hardware architecture is at least one Graphics Processing Unit (GPU). The detailed embodiment of the reconstruction method according to the invention can also be applied in other parallel architectures with slight changes within the scope of the invention. Furthermore most of the details of the embodiments are described in connection with PET reconstruction, but the most of the embodiments described below can be used for other tomographic reconstructions, such as SPECT.

The invention is a method for emission tomographic reconstruction from measurement data, the method comprising the steps of: obtaining the measurement data corresponding to activity of particle emissions of a volume from a tomographic imaging system, and performing at least one iteration step to obtain emission density data of particle emissions of the volume from the measurement data, wherein the at least one iteration step comprises a forward projection being a projection from the emission density data to the measurement data, and a back projection being a projection from the measurement data to the emission density data, and the at least one iteration step is carried out in a parallel hardware architecture, wherein both the forward projection and the back projection are of at least partially gathering type, and the measurement data is of binned type. The tomographic imaging system can be preferably a positron emission tomograph or a single photon emission computed tomograph as detailed above. The details of the forward and back projections and other details of the invention are given below.

An embodiment may be embodied in the form of computer-implemented processes and apparatuses for practicing those processes. An embodiment may also be embodied in the form of a computer program code containing instructions embodied in tangible media, such as floppy diskettes, CD-ROMs, hard drives, or any other computer readable storage medium, wherein, when the computer program code is loaded into and executed by a computer, the computer becomes an apparatus for carrying out the method. An embodiment may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for carrying out the method. When implemented on a general-purpose microprocessor, the computer program code segments configure the microprocessor to create specific logic circuits.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Therefore, the invention can take the form of a computer readable medium comprising a computer readable program for processing tomographic reconstruction from measurement data, wherein the computer readable program when executed on a computer causes the computer to perform the steps of any embodiments of the method according to the invention.

Embodiments can take the form of an entirely hardware embodiment, an entirely software embodiment or an embodiment including both hardware and software elements. In a preferred embodiment, the present invention is implemented in software, which includes but is not limited to firmware, resident software, microcode, etc.

Embodiments can take the form of a system for processing tomographic reconstruction from measurement data, characterized by comprising an obtaining unit for obtaining the measurement data corresponding to activity of particle emissions of a volume from a tomographic imaging system; and an iteration unit for performing at least one iteration step to obtain emission density data of particle emissions of the volume from the measurement data, wherein the iteration unit comprises a forward projection unit for performing a forward projection for projecting the emission density data to the measurement data: and a back projection unit for performing a back projection for projecting the measurement data to the emission density data; and wherein the iteration unit comprises a parallel hardware architecture, the forward projection and the back projection are of at least partially gathering type, and the measurement data is of binned type.

The reconstruction method according to the invention is implemented on GPU in some embodiments. The critical issue of the GPU programming and parallel programming in general, is thread mapping, i.e. the decomposition of the algorithm to parallel threads of a parallel architecture, so that the algorithm can run efficiently.

A GPU is a collection of multiprocessors, where each multiprocessor has several SIMD scalar processors that share the instruction unit and thus always execute the same machine instruction. Thus, while the GPU executes many computational threads of the same program called kernel, the threads allocated to a single multiprocessor preferably have the same control path. If two threads of the same multiprocessor execute different branches of a conditional instruction due to data dependencies, then the scalar processor should go through both branches, what would degrade performance. Thus, in the algorithm of the reconstruction method according to the invention the dependence of flow control on input data is preferably minimized. Especially preferably, data independent flow control is performed in at least a part of the scalar processors and/or the control path of parallel threads is identical for all possible input data.

The tomographic reconstruction method according to the invention is preferably free of conditional instructions and the algorithm connected to the method is preferably decomposed to phases or steps implemented by different kernels. The specific kernels are started only if the data requires execution. The iteration steps of the inventive method are carried out in parallel threads of a parallel architecture. In at least a part of the steps obtained by the factorization as detailed below, algorithms corresponding to the step are carried out in parallel threads being of identical length. This can be achieved by eliminating variable length loops from the program implementing a respective step, even if the constant length loops have more cycles than needed by the required accuracy.

Synchronization of the threads and atomic operations are an available option on a GPU but they are expensive to use, so these are preferably avoided in the inventive method. No atomic operation is needed if threads modify only their own private memory location. However, different threads may read the same memory location while the data remains constant. Generally, global memory access is slow on the GPU, especially when atomic writes are needed to resolve thread collisions, so it is preferably avoided according to the invention.

An iterative reconstruction method comprises a forward projection and a back projection, therefore there are four different ways to implement the method depending on whether scattering or gathering type approach is applied in forward projection and back projection. It is emphasized that the distinction of these cases might be just the order of loops in a CPU implementation, but is a crucial design decision when the algorithm runs on the GPU since it defines which loop is executed in parallel on the shader processors, while the scattering type steps are not favored in a parallel architecture. GPUs and in general parallel algorithms favor gathering since it computes a single result from the available data, which can be written out without communication between the computational threads and the synchronization of them.

The communication between threads of different multiprocessors is done via an external memory, which is slow. Therefore in general, external memory accesses are preferably minimized and all communication is avoided between threads in the method according to the invention. Running independent threads on different processors boosts performance proportionally with the number of processors. However, as computations on different processors are independent, temporary results obtained by different processors cannot be generally reused, which is obviously possible and worthwhile in a single thread implementation. Thus, efficiency improvement via reuse and performance enhancement via parallelism are contradicting requirements. To reuse partial results of other threads without prohibitive synchronization times, the algorithm should be broken into phases, i.e. the system matrix of the inventive method is preferably factored—as detailed below—similarly as described in an above mentioned paper (J. Qi, R. M. Leahy, S. R. Cherry, A. Chatziioannou, and T. H. Farquhar: High-resolution 3D Bayesian image reconstruction using the microPET small-animal scanner, *Physics in Medicine and Biology*, Vol. 43, pp. 1001-1013 (1998)). In this paper the factorization of the system matrix is done for the sake of reducing storage and computational costs, not to allow data reuse in a parallel scheme. When threads implementing a phase are terminated, they write out the results to the global memory. The threads of the next phase can input these data in parallel without explicit communication, therefore data of consecutive steps is at least partially reused.

The global memory is generally very slow compared to the register and local memory access and to the computational performance of processors. There is, however, one exception to this rule. If threads of the same scalar processor access neighboring data elements, then the transfer is executed in a single step which decreases the access time. Therefore, neighboring threads are preferably designed to access neighboring data elements. For example, in pure Monte Carlo particle tracing threads fetch the memory randomly, thus coherent access cannot be guaranteed. However, if particles are transferred by ray-bundles, i.e. in a step a larger set of coherent rays are processed, memory access speed can be greatly increased.

In view of the above details, the development of algorithms for the reconstruction of advanced high-resolution tomographic data is challenging due to the enormous data storage and computation requirements. As mentioned above, the required output of tomographic reconstruction methods is the emission density data for a binned type reconstruction. The emission density data is given e.g. by a function $x(\vec{v})$ in points $\vec{v}$ of a volume of interest $\square$. The volume of interest $\square$ is the volume where the positron emitting tracer material is dispersed, for example in a body to be investigated. The input of the reconstruction method is the measurement data, i.e. the measured number of hits in the conceptual detectors, e.g. LORs for example in the case of PET. The measurement data is represented by a vector $\underline{y}=(y_1, y_2, \ldots)$, $\underline{y}$ comprises the number of hits per a conceptual detector, thus $\underline{y}$ has $N_D$ components, where $N_D$ is the number of conceptual detectors.

In FIG. 1 a pair of detector elements 13' and 13" comprised in respective detector devices 10' and 10", constitutes a conceptual detector, i.e. a LOR in the case of the depicted PET system. The detector device 10' and 10" comprises other detector elements 12 as well. Propagation line 14 of a photon pair in direction $\vec{107}$ is illustrated in the figure. This photon pair is detected on detector elements 13' and 13", thus gives a contribution to the LOR of the detector elements 13' and 13". The photon pair is emitted roughly in parallel by the annihilation of a positron. The point of emission of the photon pair is denoted by $\vec{v}$ in FIG. 1 and the emitted photons are propagating in the $\vec{107}$ and $-\vec{107}$ directions, respectively. The measurement data of the LOR connecting detector elements 13' and 13" can also comprise other events. A volume of interest is also shown in FIG. 1, which comprises a head in the shown example.

To represent the unknown $x(\vec{w})$ function with finite data, it is approximated in a finite function series form, i.e. the volume of interest is divided into sub-volumes called voxels:

$$x(\vec{v}) = \sum_{V=1}^{N_{voxel}} x_V b_V(\vec{v})$$

where $x_v$ is a $V^{th}$ voxel value. Voxel values are elements of vector $\underline{x}=(x_1, x_2, \ldots)$, which has $N_{voxel}$ components. In a reconstruction method these voxel values are the unknown coefficients which have to be found based on measurement data. In the above expression $b_v(\vec{v})$ functions are pre-defined basis functions for each voxel.

The expectation value of the number of hits from all points to conceptual detector D is:

$$\tilde{y}_D = \int_V x(\vec{v}) T(\vec{v} \to D) d\vec{v} = \sum_{V=1}^{N_{voxel}} A_{DV} x_V$$

where $\tilde{y}_D$ is the expected number of hits for conceptual detector D corresponding to a certain $x(\vec{v})$ emission density data, $T(\vec{v} \to D)$ is the system sensitivity, i.e. the probability that an emission in point $\vec{v}$ is detected by the conceptual detector D, $\square$ is the volume of interest, and $$A_{DV} = \int_V b_V(\vec{v}) T(\vec{v} \to D) d\vec{v}$$

is an element of the system matrix A which connects the conceptual detector D and voxel V. The difference between $y_D$ and $\tilde{y}_D$ should be emphasized; $y_D$ is the measured number of hits for conceptual detector D, i.e. the measurement data and $\tilde{y}_D$ is the expected number of hits for a given $x(\vec{v})$ distribution, therefore its value changes during the reconstruction process as $x(\vec{v})$ changes during the iteration steps.

According to the concept of maximum likelihood estimation (L. Shepp and Y. Vardi: Maximum likelihood reconstruction for emission tomography, *IEEE Trans. Med. Imaging*, Vol. 1, pp. 113-122 (1982)), i.e. expectation maximization (EM), a function $x(\vec{v})$ is searched for that maximizes the likelihood of the measured data assuming that measured values are independently and randomly distributed and follow Poisson distribution. This optimization alternates forward projection $$\tilde{y}_D = \sum_{V=1}^{N_{voxel}} A_{DV} x_V^{(n)}$$

and back projection $$x_V^{(n+1)} = x_V^{(n)} \cdot \frac{\sum_{D=1}^{N_D} A_{DV} \frac{y_D}{\tilde{y}_D}}{\sum_{D=1}^{N_D} A_{DV}}$$

in each of the n=1, 2, ... iteration steps. Expectation maximization used in preferred embodiments of the invention. As the formula of back projection shows, in back projection the estimation of emission density data is corrected based on the ratio of measured hit numbers and expected hit numbers.

FIG. 2A shows the conceptual model of emission tomography. The 3D source of emitted particles is divided into several voxels, e.g. voxels 16', 16", 16'''. Emitted particles may end up in detector elements 12', 12", 12''' after traveling in space including possible scattering and type-changes as demonstrated by particle paths 15. After making an assumption on the voxel values for each voxel in back projection, the expected values of the conceptual detector hits have to be computed in the forward projection, which require the integration of the contribution of all possible particle paths. As the source and the detector elements have 3D domain, and scattering can happen anywhere in the 3D space, the contribution of sources to detector elements is a high-dimensional integral in the domain of source points, detector points and arbitrary number of scattering points. Such high-dimensional integrals are preferably calculated by a Monte Carlo quadrature that randomly traces sample paths. The more paths are computed, the higher precision reconstruction is obtained.

As detailed above, to have the possibility to reuse temporary results of other threads, the particle transport process according to the forward and back projections is preferably decomposed to phases by introducing virtual detector devices comprising virtual detector elements. As it is described below, this factorization has other advantages as well. In FIG. 2B virtual detector elements 18', 18", 18''' are illustrated. By the application of virtual detector elements 18', 18", 18''' the particle transport process is factorized. It is clear from the figure that the factorization leads to the segmentation of particle paths 15 into path segments 17 and 19. In the simulation of particle propagation, their paths are first executed to the virtual detector elements—path segments 17 in FIG. 2B, then virtual detector elements 18', 18", 18''' become virtual sources and the next phase simulates transport from the virtual sources to the real detector elements—path segments 19.

Consequently, the idea of factoring is that the transport process. i.e. the whole propagation from the emission of a particle until it is detected in a detector element, is decomposed to phases with the introduction of virtual detector elements. FIG. 2B shows decomposition into two phases, but more than two phases are also possible in a tomography reconstruction method. First, the expected values in the first layer of virtual detector elements are computed from the source. Then, the first layer of these detector elements become sources and a similar algorithm is executed until the real detector elements are reached. The advantages of the factorization are the following:

- The calculation of a single phase can be much simpler than the complete transport process, thus all conditional statements can be preferably eliminated, which increases GPU efficiency.
- As a computed sample path ended in a virtual detector element is continued by all paths started here in the next phase, a much higher number of sample paths will be available to compute high dimensional integrals, thus the result is more accurate. Note that the number of sample paths increased from 4 to 16, in the arrangements of FIG. 2A to FIG. 2B.
- Each phase is computed in parallel on the GPU where threads do not communicate. However, a next phase can reuse the results of all threads of a previous phase, so redundant computations can be eliminated.

The only disadvantage of factoring is that virtual detector devices discretize the continuous space into finite number of bins, so if their number is small, a discretization error occurs. The optimal definition of the virtual detector devices depends on the type of the tomograph. Examples are provided in the context of PET in the following. After factoring, the phases are considered one-by-one and the above introduced transport equation $$\tilde{y}_D = \int_V x(\vec{v}) T(\vec{v} \to D) dv$$

should be reinterpreted in the factored case. When factorization is used, $\square$ is the domain of source distribution considered in the investigated phase, $\tilde{y}_D$ is the expected number of hits in detector element D of the phase, which can be virtual detector elements, and $T(\vec{v} \to D)$ is the probability density of transporting from virtual source point $\vec{v}$ to virtual detector element D.

When a factored phase is computed, both gathering and scattering type algorithms can be proposed that may have significantly different accuracy depending on the data to be reconstructed. For example, one type of the algorithms can be good to estimate larger homogeneous regions, while the other type to estimate small high intensity features. The gathering type and the scattering type algorithms may be associated with significantly different computational cost on the parallel hardware.

To summarize, it can be said that for the optimal compromise between thread independence and reuse of temporary results, forward projection and back projection are preferably factored to phases or steps that can be executed independently and without communication. The factored steps can be based on different computation paradigms, including analytic calculations, numerical quadrature, or exploitation of measured or simulated data. According to the GPU requirements, all steps are at least partly of gathering type in the reconstruction method according to the invention. Gathering is implemented in a way that a thread computes a single output value from all relevant inputs. In the forward projection of a PET reconstruction method, the computation process follows the direction from the voxels of positron density towards the expected LOR hits. Furthermore in back projection of it, the direction is from the ratios of expected and measured LOR values to the new voxel values, so the factored phases are computed in the reverse order and the input and the output of the phases are exchanged.

Multiple importance sampling is a general mathematical approach to combine different Monte Carlo estimators (E. Veach and L. Guibas: Optimally combining sampling techniques for Monte Carlo rendering. *Computer Graphics Proceedings, Annual Conference Series*, 1995 (ACM SIGGRAPH '95 Proceedings), pp. 419-428 (1995)). In an embodiment of the inventive method, multiple importance sampling is proposed for application in phases of emission tomography to meet the goals of accuracy and efficient parallel implementation. These phases consider the transport from either virtual or real sources to either virtual or real detector devices. The application of the concept of multiple importance sampling for the evaluation of the transport equation $$\tilde{y}_D = \int_V x(\vec{v}) T(\vec{v} \to D) dv$$

is presented below when two different methods, an output-driven i.e. gathering type and an input-driven, i.e. scattering type are used simultaneously. The special case of using just a single—i.e. gathering or scattering—type method is also obtained by setting the sample numbers of other methods to zero.

With the application of multiple importance sampling the reconstruction method in these embodiments becomes highly accurate for all types of data, i.e. applicable either for homogeneous regions or small, high intensity regions to be reconstructed and is fast on the target parallel architecture.

The details of the implementation of the multiple importance sampling are the following. Generally in the phases of the forward projection and the back projection, a set of (virtual) sources, i.e. voxels and a set of (virtual) detector elements are considered as introduced above. In a step using multiple importance sampling $N_o$ output-driven, i.e. detector oriented samples in the points $\vec{v}_1, \ldots, \vec{v}_{N_o}$ of the source domain are taken for each detector element D, drawn from probability density $p_o(\vec{v}, D)$ which is at least approximately proportional to the transport probability, $T(\vec{v} \to D)$. The density of samples is $d_o(\vec{v}, D) = N_o \, p_o(\vec{v}, D)$, thus the Monte Carlo estimation of detected hits of this sampling strategy would be:

$$\tilde{y}_D^o \approx \sum_{s=1}^{N_o} \frac{x(\vec{v}_s) T(\vec{v}_s \to D)}{d_o(\vec{v}_s, D)}.$$

Then, additionally $N_i$ input-driven, i.e. source oriented samples $\vec{v}_{N_o+1}, \ldots, \vec{v}_{N_o+N_i}$ are obtained from probability density $p_i(\vec{v})$ which is at least approximately proportional to the source emission density, $x(\vec{v})$. Thus, the density of samples is $d_i(\vec{v})=N_i p_i(\vec{v})$. The Monte Carlo estimation of the number of hits detected in detector element D using this sampling strategy would be:

$$\tilde{y}_D^i = \sum_{s=N_o+1}^{N_o+N_i} \frac{x(\vec{v}_s)T(\vec{v}_s \to D)}{d_i(\vec{v}_s)}.$$

Instead of these estimators considering just a single sampling strategy, the use of the mixture of the two sample sets is proposed according to an embodiment of the invention to compute the expected number of detector element hits as:

$$\tilde{y}_D = \sum_{s=1}^{N_o+N_i} \frac{x(\vec{v}_s)T(\vec{v}_s \to D)}{d_i(\vec{v}_s) + d_o(\vec{v}_s, D)}.$$

Individual densities $d_i$ or $d_o$ do not have to cover the total integration domain, it is enough if at least one of the strategies generates a given source point of non-zero emission with non-zero probability. Note that in the case of forward projection, detector oriented sampling leads to an output-driven, i.e. gathering type algorithm and is thus more efficient on parallel hardware, while source oriented sampling leads to an input-driven, i.e. scattering type algorithm that may result in colliding writes. Number of samples $N_i$ and $N_o$ must be set to consider the requirements that combined density $d_o(\vec{v}, D)+d_i(\vec{v})$ should be roughly proportional to integrand $x(\vec{v})T(\vec{v} \to D)$ and the total computational cost of $N_i$ source oriented and $N_o$ detector oriented samples should be minimal taking into account the parallel hardware.

As parallel hardware typically favors gathering algorithms, it is worth using more output-driven samples than input-driven ones. However, if some phenomenon in smaller regions is much better sampled by an input-driven approach, then its density will be higher in this smaller region than that of the output-driven samples. Thus, the advantages of input-driven sampling can be preserved even if their number is small. Input-driven samples can represent well strongly inhomogeneous sources containing small, intensive features, and thus are good in reconstructing them. Output-driven samples, on the other hand, cover the whole source domain fairly uniformly and are thus good at reconstructing larger homogeneous features. The combined method, i.e. a reconstruction method according to an embodiment of the invention is good in all aspects since the sampling strategy automatically emphasizes a method where it places more samples.

Figure 3:
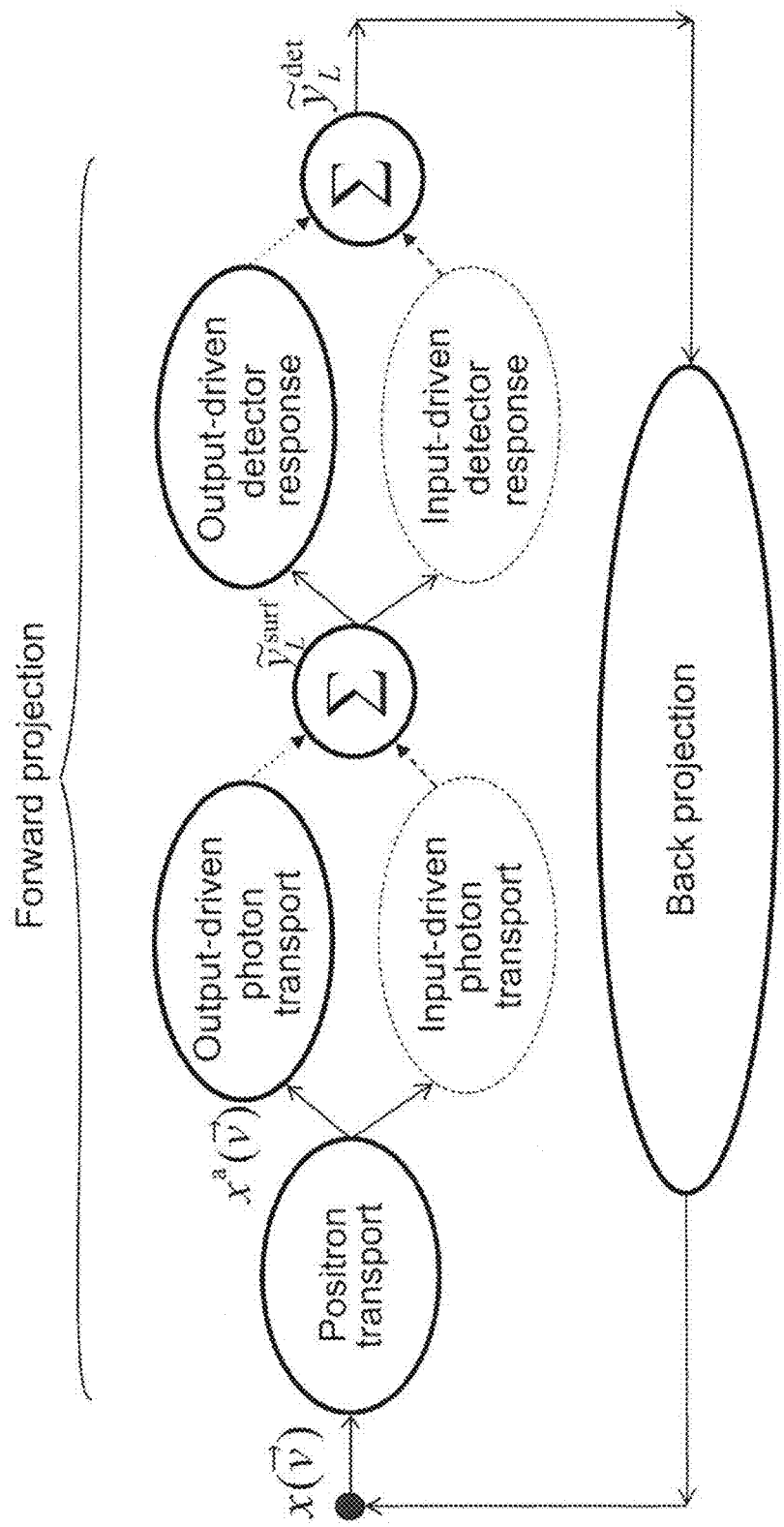
FIG. 3 represents an embodiment of the inventive method in a flowchart.

In the following, the application of an embodiment of the inventive method is demonstrated for PET reconstruction but it is similarly feasible for SPECT reconstruction taking into account that there is no positron propagation step in a SPECT reconstruction. The overview of a PET reconstruction algorithm is shown in FIG. 3. In FIG. 3, the details of an iteration step are shown in one embodiment of the inventive reconstruction method. As it is shown in the figure the transport process of the forward projection is decomposed into three factored steps in this embodiment:

1. Positron transport step for describing the propagation of the positron from a point of origination to a point of annihilation where the positron annihilates and two oppositely directed gamma photons are born. This step computes an annihilation density $x^a(\vec{v})$ from positron emission density $x(\vec{v})$, as an exemplary emission density data.
2. Photon transport step that describes photon propagation from the annihilation point—or point of origination—to a surface of a detector crystal, i.e. detector element. In this step the expected number of hits on the surfaces of the detector elements (LORs), $\tilde{y}_L^{surf}$, is computed from the annihilation density.
3. Detector response step (detector evaluation step) that describes photon propagation from the surface of the detector element to the output of the detector element. In other words this step is responsible for all phenomena happening in the detector elements, i.e. crystals, including inter-crystal scattering, absorption, and the sensitivity of crystals and electronics.

The system matrix connecting the measurement data and the emission density data is factorized in this embodiment into sub-matrices according to the photon transport step, the detector evaluation step and the positron transport step. Each of these phases is detailed below, but the whole iteration cycle is detailed here on the basis of FIG. 3. Starting from the positron emission density data $x(\vec{v})$ denoted by a dot on the left hand side of the figure, the annihilation density, $x^a(\vec{v})$ is calculated from $x(\vec{v})$ by the application of a positron transport step. Annihilation of the positrons into a pair of photons happens at this point, so in the next phase the transport of the photon pair is to be considered. The multiple importance sampling scheme is used in the photon transport step as it is demonstrated in FIG. 3. The bubble corresponding to the input-driven transport is encircled by a dashed line. The results coming from the two paths, are synthesized into the virtual detector element data, $\tilde{y}_L^{surf}$. These virtual detector elements are the real detector elements in this detailed example, but considering the next phase, i.e. the detector evaluation step, it should be emphasized that the virtual detector element data, $\tilde{y}_L^{surf}$, is not the data which have to be compared to the measurement data of the detector elements. The measurement data have to be compared to the virtual detector element data obtained after the detector response step, i.e. $\tilde{y}_L^{det}$. The virtual detector elements inserted after the detector response phase are detector elements of the respective conceptual detectors, i.e. LORs in the case of PET. It is shown in FIG. 3 that multiple importance sampling is taken into account also in the phase of detector response. In back projection, the results obtained from the forward projections, i.e. $\tilde{y}_L^{det}$ are compared to the measurement data of the respective LORs. To summarize, multiple importance sampling is involved in the present embodiment in such a way that the photon transport step and/or the detector response/evaluation step are of at least partly scattering type. The scattering methods are introduced in order to make the present embodiment of the inventive method more suitable for the reconstruction of any kind of measured data. Note, that the usage of only a small number of input-driven threads improves the results of the reconstruction.

The reads and writes indicated by arrows are also distinguished by their types in FIG. 3. Arrows with a solid line correspond to parallel non-exclusive reads from arrays that are constant during the thread run. This means that each data of the array can be used by several threads, but these threads do not alter the value of the data. Such a read is used e.g. when contributing voxels are collected for a LOR, value of a single voxel can give contribution for more than one LOR. Arrows with a dotted line correspond to the case of non-colliding writes, a thread in this case writes only its own private data element. This kind of write is used in the case of output-driven, i.e. gathering type threads which are preferred for a parallel architecture. In the case where the writes are non-colliding, there is no need to use atomic writes. Atomic writes only have to be used for threads denoted by a dashed arrow in FIG. 3, i.e. an atomic write has to be used in the case of an input-driven thread. Note that preferably only a small number of input-driven threads are used compared to the number of the output-driven threads, therefore the use of atomic writes is not typical in the method, but the use of input-driven threads makes it possible that the inventive reconstruction method in this embodiment can be used more general for any kind of data.

Note that during the reconstruction, registered CT data can be also used for taking into account material dependent positron transport, i.e. the type of the material comprised in a voxel can be taken into account in the positron transport phase.

Note that the embodiment introduced in FIG. 3 can be modified in such a way that only the output-driven algorithms are used in photon transport step and/or detector evaluation step. Also the amount of input-driven data used in the reconstruction can be varied e.g. by the type of the investigated material.

In the following some of the above introduced steps of the forward projection are detailed. The steps which are not detailed below are performed in a way known per se. As also mentioned above, forward projection simulates the physical phenomena from the emission of positrons to the output of detector electronics and executes the factored steps of positron transport, photon transport (also referred to as geometric forward projection if scattering is computed separately), and detector evaluation that itself consists of detector blurring and sensitivity simulation.

First, in the positron transport step, the followings are taken into consideration. The annihilation density $x^a(\vec{v}_a)$ due to positron range is computed as a blurring of the current estimate of the positron density with a filter kernel storing the probabilities of positron offsets between positron generation and annihilation:

$$x^a(\vec{v}_a) = \int_V x(\vec{v}_p) P(\vec{v}_a - \vec{v}_p) d v_p$$

where $P(\vec{v}_a - \vec{v}_p)$ is the probability density that a positron born in $\vec{v}_p$ annihilates in $\vec{v}_a$. This convolution like expression is valid only if the material is homogeneous.

To extend it to the inhomogeneous case, a local homogeneous approximation can be applied and the blurring kernel can be used that is associated with the material where the positron is emitted. This approximation is accurate far from material boundaries but loses its accuracy close to the boundary. Denoting the index of the material at point $\vec{v}_p$ by $m(\vec{v}_p)$, expression $$x^a(\vec{v}_a) = \sum_m \int_V x(\vec{v}_p) \xi_m(\vec{v}_v) P_m(\vec{v}_a - \vec{v}_p) d v_p$$

is obtained. In the expression, $\xi_m(\vec{v}_p)$ is an indicator function that is 1 if in point $\vec{v}_p$ there is material of index m and zero otherwise. As the computational complexity of filtering in spatial domain is proportional to the product of the voxel numbers in the positron density volume and the kernel, spatial filtering gets prohibitively expensive for large kernels. The feasible approach is the execution of the filtering in frequency domain, for which efficient 2D and 3D fast Fourier transformation solutions exist for the GPU (NVIDIA, http://developer.nvidia.com/cuda, in: The CUDA Homepage.).

Computing the Fourier transformation (denoted by calligraphic F) of both sides, the expression $$x^a(\vec{v}) = \mathcal{F}^{-1}\left[\sum_m \mathcal{F}[x(\vec{v})\xi_m(\vec{v})] \cdot \mathcal{F}[P_m(\vec{v})]\right]$$

is obtained. Note that this computation requires the Fourier transforms of the blurring functions computed during preprocessing for each material, the Fourier transformation of the positron density once for each material type (usually two or three), and a single inverse Fourier transformation.

Instead of using the kernel associated with the material of the positron emission location, the kernel of the material at the position of the annihilation can also be used, which leads to the following convolution:

$$x^a(\vec{v}_a) = \sum_m \xi_m(\vec{v}_a) \int_V x(\vec{v}_p) P_m(\vec{v}_a - \vec{v}_p) d v_p.$$

The convolutions in the sum can also be computed via Fourier transformations:

$$x^a(\vec{v}) = \sum_m \xi_m(\vec{v}) \mathcal{F}^{-1}[\mathcal{F}|x(\vec{v})| \cdot \mathcal{F}[P_m(\vec{v})]].$$

This second option is more expensive computationally since here the numbers of both the Fourier transformations and the inverse Fourier transformations are equal to the number of materials. The accuracy of the two techniques depends on whether or not the material including most of the radioisotopes occupies a larger part of the object.

Herebelow, the description of the photon transport step is detailed. In the present embodiment, only a geometric model is considered, where scattering and random events do not take place.

As the input and output of the step of the photon transport are the voxel array defining the annihilation density and the expected number of hits in LOR L, $\tilde{y}_L^{surf}$, respectively, a gathering approach leads to a parallelization scheme where a thread is responsible for computing a single LOR from all relevant voxels.

Figure 4:
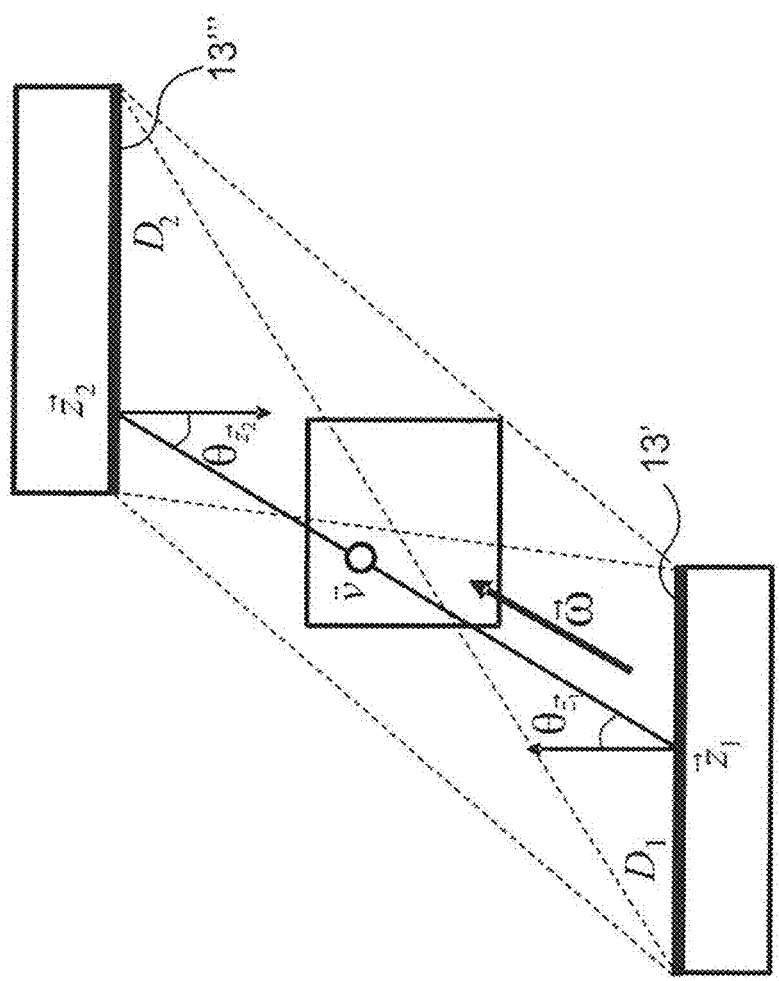
FIG. 4 shows a voxel being on the line connecting two detector elements.

Considering only the geometry in the present embodiment, i.e. ignoring the scattering of the propagating particle in the investigated object, a detector element pair can be affected only if its detector elements are seen at opposite directions from annihilation point $\vec{v}$. Note, that the photon non-collinearity can be modeled not only during the geometric part of the photon pair transport, but can also be approximated as a LOR-space blurring (A. Rahmim, J. Tang, M. Lodge. S. Lashkari, M. Ay, R. Lautamaki, B. Tsui, F. Bengel: Analytic system matrix resolution modeling in PET: an application to Rb-82 cardiac imaging, *Phys Med Biol.*, Vol. 53, pp. 5947-65 (2008)). The above assumption also means that annihilation point $\vec{v}$ where the photon pair is born and their directions $\overrightarrow{107}$ and $\overrightarrow{107}$ unambiguously identify detector element hit points $\vec{z}_1$ and $\vec{z}_2$, or alternatively, from detector element hit points $\vec{z}_1$ and $\vec{z}_2$, those points $\vec{v}$ and direction $\overrightarrow{107}$, which can contribute can be determined, as it is shown in FIG. 4. The view point is modified herebelow from the annihilation points and directions to detector element hit points, and using the correspondence between them, the detector response is expressed as an integral over the detector element surfaces and an integral along lines between the surface points.

The integrals over the detector element surfaces can be estimated by $N_{detline}$ discrete line samples, i.e. point pairs ($\vec{z}_1^{(s)}, \vec{z}_2^{(s)}$) on the surface of detector elements 13' and 13". For the evaluation of the line integral, Siddon's algorithm (R. L. Siddon: Fast calculation of the exact radiological path for a three-dimensional ct array, *Medical Physics*, Vol. 12. pp. 252-257 (1985)) would be a usual choice, but it assumes piece-wise constant finite-element approximation and may end up different number of loop cycles for different line samples, which degrades multiprocessor performance. Thus, according to an embodiment of the inventive method, $N_{march}$ equidistant points $\vec{l}_{s,r}$—index r runs from 1 to $N_{march}$—are taken along each line segment s ($\vec{z}_1^{(s)}, \vec{z}_2^{(s)}$) and the line integral is preferably evaluated with trapezoidal quadrature. Note that this scheme is applicable not only for piece-wise constant but for other basis-functions as well, its implementation does not need conditional instructions, and is very fast if $x^a(\vec{l}_{s,r})$ is read from a 3D texture since tri-linear interpolation is directly supported by the hardware, and the probability that neighboring threads need neighboring voxels is high, which improves cache utilization. This approach is similar to Joseph's method (P. M. Joseph: An improved algorithm for reprojecting rays through pixel images, *IEEE Transactions on Medical Imaging*, Vol. 1, pp. 192-196 (1982)) but may take more than one sample in a voxel. The extra samples slightly increases the accuracy since tri-linear basis functions lead to cubic integrands in the line integral. The extra samples are not worth being eliminated to improve performance since the SIMD architecture does not prefer different loop cycles in different threads computing different line integrals.

The error of the estimation of the forward projection depends on the number of line samples $N_{detline}$ and point samples per line $N_{march}$, and also on the discrepancy of the samples in the five-dimensional space defined by the two two-dimensional spaces of the detector element surfaces and the one-dimensional space of the line (H. Niederreiter: Random number generation and quasi-Monte Carlo methods, SIAM, Pennsylvania, 1992).

Figure 5:
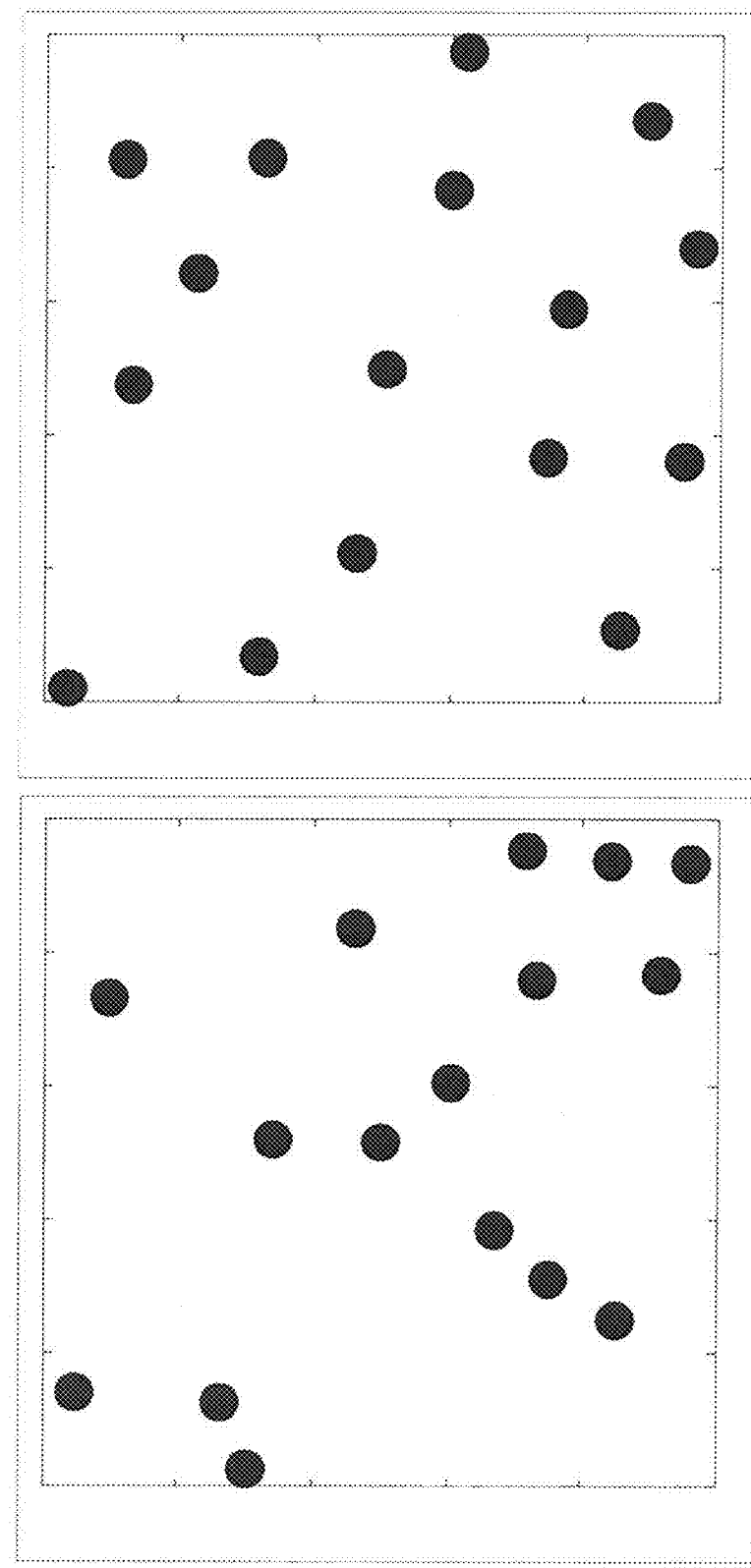
FIG. 5A shows an exemplary independent random distribution of points in a rectangular area.
FIG. 5B shows an exemplary Poisson-disk distribution of points in a rectangular area.
Figure 6:
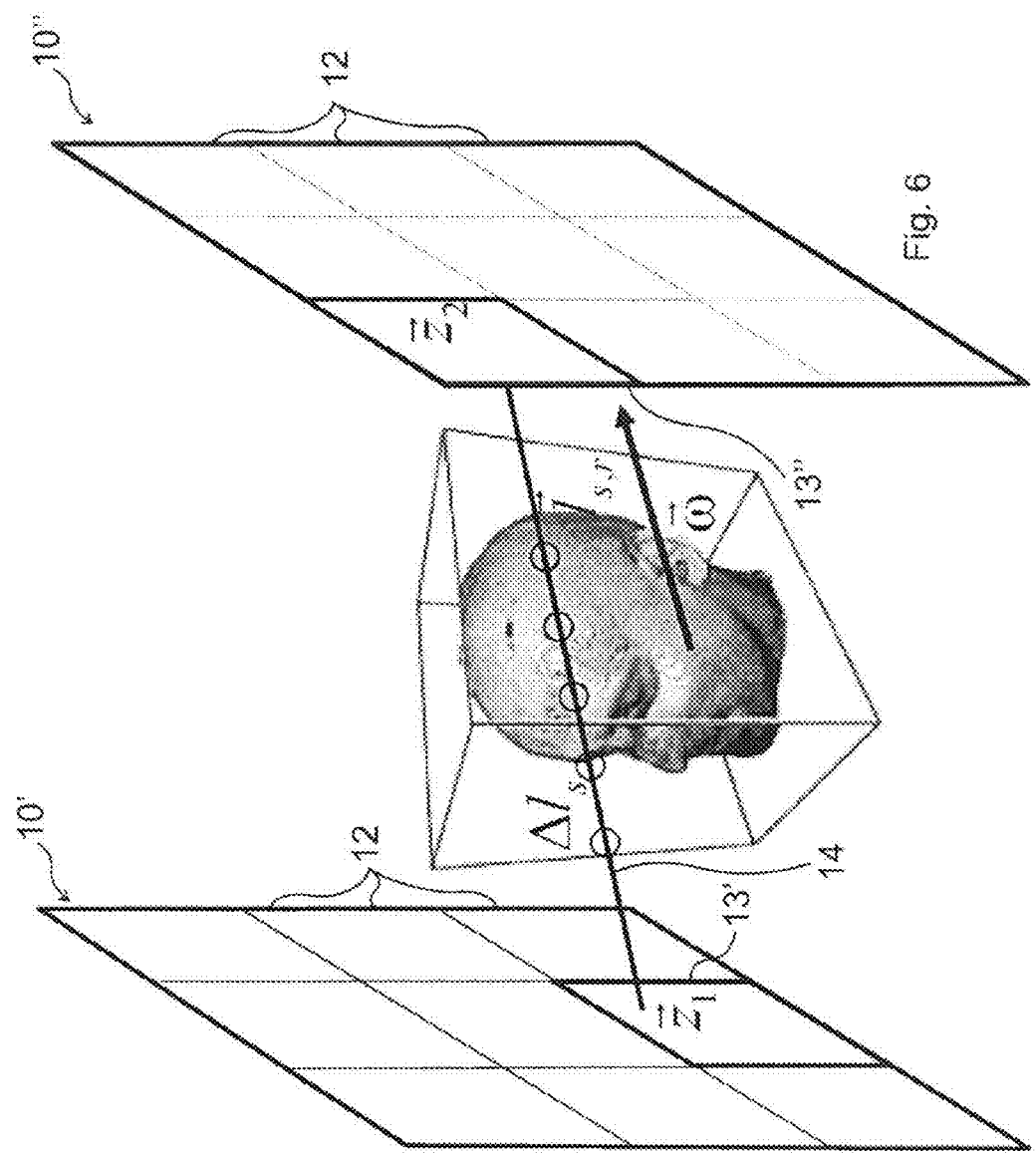
FIG. 6 shows an object placed between two parallel detector devices and the notations in connection with the identification of a LOR and a detector element in a detector device.

For choosing point pairs ($\vec{z}_1^{(s)}, \vec{z}_2^{(s)}$) on detector element surfaces, Poisson-disk distributed sample points can be used for sampling each of the detector element surfaces, respectively. Sampling a surface by independent random distribution and by Poisson-disk distribution are both demonstrated in FIGS. 5A and 5B, respectively. It is clear from the figure that the surface of a detector element can be covered in a more uniform way using Poisson-disk distribution. Sets of sample points should be preferably computed only once and the result can be stored in a constant array. Line integrals between the sample points are approximated preferably taking equi-distant points $\vec{l}_{s,r}$ with distance $\Delta l_s$ starting with a random offset. $\Delta l_s$ and $\vec{l}_{s,r}$ are demonstrated in FIG. 6. With these, the integral estimator is:

$$\tilde{y}_L^o = \sum_{s=1}^{N_{detline}} \sum_{r=1}^{N_{march}} \frac{x^a(\vec{l}_{s,r})/(2\pi)}{d_o(\vec{l}_{s,r}, \vec{\omega}_s)}$$

where $x^a$ is the annihilation density and $d_o$ is $$d_o(\vec{l}, \vec{\omega}) = \frac{N_{detline}|\vec{z}_1 - \vec{z}_2|^2}{D_1 D_2 \cos\theta_{\vec{z}_1} \cos\theta_{\vec{z}_2} \Delta l_s}$$

where line segment end points $\vec{z}_1, \vec{z}_2$ and ray marching step size $\Delta l_s$ can be unambiguously determined from the line of a place vector $\vec{l}_{s,r}$ and direction vector $\overrightarrow{107}$, and from the arrangement of the detector elements 13', 13" and the volume to be reconstructed. It has to be noted that in the normal case $\tilde{y}_L^o$ is equivalent to the above introduced $\tilde{y}_L^{surf}$ but e.g. in the case of using multiple importance sampling the above expression changes further and $\tilde{y}_L^{surf}$ is expressed in a more complicated way as introduced above. Application of multiple importance sampling to the description of photon transport is detailed herebelow.

In an embodiment of the inventive method, multiple importance sampling is applied to the computation of photon pair transport, i.e. this phase is of partly scattering type. Consequently input-driven sampling is used besides output-driven sampling. In input-driven sampling, first $N_v$ volume points $\vec{v}_s$ are obtained with a density that is proportional to the activity. Then, line directions are sampled by placing uniformly distributed hit points $\vec{z}_1$ on detector element surface $D_1$ of the detector element being farther from the two modules of coincidence. Volume point $\vec{v}_s$ and surface point $\vec{z}_1$ unambiguously define a line of direction $\overrightarrow{107}_s$, which identifies detector element pair L by the intersected detector element surface on the closer detector element. Putting just a single sample on each detector element surface $D_1$, the expected number of hits in LOR L is $$\tilde{y}_L^i = \sum_{s=1}^{N_v} \frac{x^a(\vec{v}_s)/(2\pi)}{d_i(\vec{v}_s, \vec{\omega}_z)}$$

where density $d_i$ is:

$$d_i(\vec{v}, \vec{\omega}) = \frac{N_v x^a(\vec{v})|\vec{v} - \vec{z}_1|^2}{X D_1 \cos\theta_{\vec{z}_1}}$$

where X is the total activity.

Figure 7:
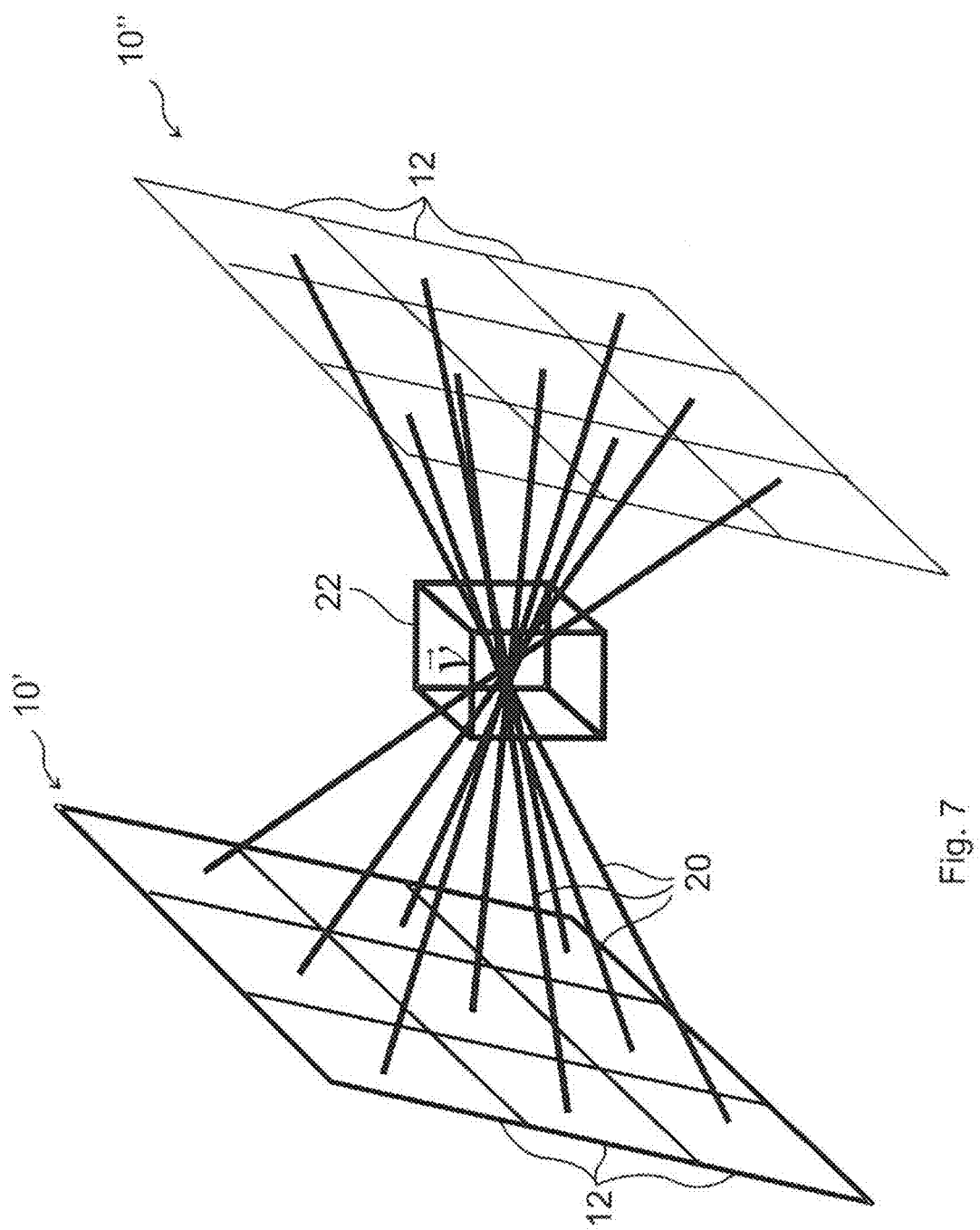
FIG. 7 shows a voxel placed between two parallel detector devices and lines connecting pairs of detector elements.

In FIG. 7 the input-driven scheme is demonstrated. A single computational thread of the input-driven photon pair transport calculation samples points $\vec{v}$ in proportion to the annihilation density $x^a(\vec{v})$ and processes a line crossing this point for each LOR as shown in the figure. FIG. 7 shows a voxel 22 which contributes through exemplary lines 20 to many of the detector elements 12 of the detector devices 10', 10".

In an input-driven method, the positron density. i.e. the activity is taken into account during sampling. In an output-driven method, on the other hand, the activity is identified at the end of the computation process, thus the activity cannot be taken into account in the density of sampling. Consequently, an input-driven approach is typically more accurate when the activity distribution has a very high variation, for example, when the activity is concentrated in a small region. However, the output-driven method is better than the input-driven in reconstructing colder—low-activity—regions.

In preferred embodiments involving multiple importance sampling, a combination of output-driven and input-driven schemes is used, which keeps the advantages of both. The above introduced output-driven and input-driven algorithms kept unchanged, only the sample weights are modified. Then, the estimators of different techniques are simply added as follows. The combined sample density is $$d(\vec{l}, \vec{\omega}) = \frac{N_{detline}|\vec{z}_1 - \vec{z}_2|^2}{D_1 D_2 \cos\theta_{\vec{z}_1} \cos\theta_{\vec{z}_2} \Delta l_s} + \frac{N_v x^a(\vec{v})|\vec{v} - \vec{z}_1|^2}{X D_1 \cos\theta_{\vec{z}_1}}$$

With this sample density, the modified output-driven projection and input-driven projection are $$\tilde{y}_L^o = \sum_{s=1}^{N_{detline}} \sum_{r=1}^{N_{march}} \frac{x^a(\vec{l}_{s,r})/(2\pi)}{d(\vec{l}_{s,r}, \vec{\omega}_s)} \text{ and}$$

$$\tilde{y}_L^i = \sum_{s=1}^{N_v} \frac{x^a(\vec{v}_s)/(2\pi)}{d(\vec{v}_s, \vec{\omega}_s)},$$

respectively. The final estimator is the sum of the two estimators: $\tilde{y}_L^{surf} = \tilde{y}_L^o + \tilde{y}_L^i$.

For the sake of simplicity, in the above embodiment the photon pair transport is detailed with the assumption that there is neither scattering nor random events. However, the proposed invention is compatible with various types of scattering compensation algorithms (M. Magdics, L. Szirmay-Kalos, B. Tóth, Á. Csendesi, and A. Penzov. Scatter estimation for PET reconstruction, in: *Proceedings of the 7th international conference on Numerical methods and applications*, NMA '10, pp. 77-86, Berlin. Heidelberg, Springer-Verlag (2011)), random event, dead-time compensation algorithms and can involve physically accurate detector elements or crystals, gamma-photon absorption models and can be extended to take binned time-of-flight data into account.

In the following the step corresponding to the response of a detector element is detailed Detector elements are parts of planar detector devices or modules and form a 2D discrete grid. A single detector element can be identified by a pair of integer coordinates $c=(c_x, c_y)$ in this grid. Coordinate pairs of detector elements are denoted by bold letters in the expressions below. Photons may get scattered in detector elements before they get finally absorbed. The number of reported hits due to absorption may be different in different detector elements due to the variation of crystal sensitivity of the crystal of a detector element and the associated electronics. In a preferred embodiment, in order to reduce the data needed to model detector devices including detector elements, the detector evaluation step comprises a detector blurring step for describing photon propagation from the surface of a detector element to absorption of the photon, and a detector measurement step for describing an evaluation from the absorption of the photon to the output of detection, wherein the system matrix is factorized into sub-matrices also according to the detector blurring step and the detector measurement step.

The photon transport is assumed to be translation invariant so it can be modeled by a single, incident direction dependent blurring kernel. To handle crystal sensitivity of the detector elements and electronics connected to the detector elements, each detector element c is characterized by a detector—or crystal—sensitivity value $\epsilon_c$. The detector sensitivity value is the expected number of events reported in this detector element or crystal by the output of the measuring system, provided that a photon has been absorbed here. It is assumed that this parameter is available for every detector elements, or can be obtained by indirect measurements.

Figure 8:
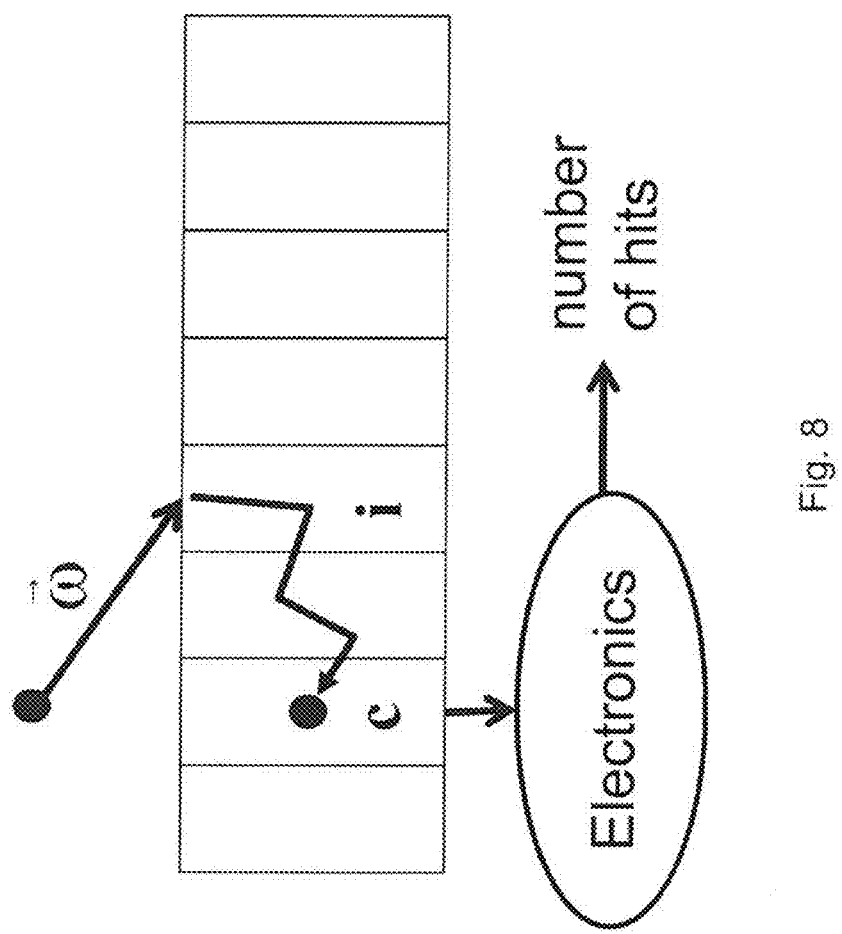
FIG. 8 shows a group of detector elements in which a particle is propagating.

Scattering inside the detector elements can be modeled by a crystal transport probability $p_{i \to c}(\overrightarrow{107})$ that specifies the conditional probability that a photon is absorbed in detector element c provided that it arrives at the surface of detector element i from direction $\overrightarrow{107}$ as demonstrated in FIG. 8.

It is supposed that the detector elements are small with respect to the distance of the detector devices, so direction $\overrightarrow{107}$ of the LOR is constant for those detector elements which are in the neighborhood of c and where $p_{i \to c}$ is not negligible.

The sum of the crystal transport probabilities is the detection probability, i.e. the probability that the photon does not get lost, or from a different point of view, the photon does not leave the module without absorption:

$$v(\vec{\omega}) = \sum_c p_{i \to c}(\vec{\omega})$$

Let us consider a LOR connecting crystals $c_1$ and $c_2$ and having direction $\overrightarrow{107}$. The expected number of hits in this LOR is:

$$\tilde{y}_{L(c_1,c_2)}^{det} \approx \epsilon_{c_1} \epsilon_{c_2} \sum_i \sum_j \tilde{y}_{L(i,j)}^{surf} p_{i \to c_1}(\vec{\omega}_{ij}) p_{j \to c_2}(\vec{\omega}_{ij})$$

It is clear from the expression that the detector response calculation is a convolution operation in four-dimensional LOR space. The space of the LORs is four-dimensional since a LOR is determined by its two end points, each given by a coordinate pair on the detector surfaces.

The detector elements of an exemplary PET system are LYSO crystals, the average free path of gamma-photons of 511 keV is about 5 mm, while detector elements are packed at about 1.12 mm distance, thus with non-negligible probability, photons of larger incident angles can be absorbed farther than the tenth neighbor of the detector element where the photon entered the detector device. Thus, the convolution of the above expression should cover at least 20×20 detector elements on both ends of the LOR, which makes the number of terms to be summed greater than $20^4$. The prohibitive cost of such large LOR convolution cannot be reduced by filtering in the frequency domain since the expression also depends on the incident directions, and therefore spatially variant in LOR space. Instead, to reduce the computation time, the long sum is evaluated by Monte Carlo estimation taking $N_o$ random offset samples, where a sample is associated with a pair of offset vectors $t_1=c_1-i$ and $t_2=c_2-j$. The density of samples is $$d_o(i, j, c_1, c_2) = \frac{N_o p_{i \to c_1}(\vec{\omega}_{ij}) p_{j \to c_2}(\vec{\omega}_{ij})}{v_1(\vec{\omega}_{ij}) v_2(\vec{\omega}_{ij})}.$$

Relaxed sample sets are preferably pre-generated sample sets containing $N_o$ samples by minimizing the difference between their distribution and the real distribution, which is measured or calculated with a transport Monte Carlo simulation off-line. These pre-generated samples are preferably used in the detector blurring step. Thanks to the translation invariance, it is sufficient to carry out the measurement or the off-line simulation and sample generation only once and use the same set of samples in each LOR.

Multiple importance sampling can also be adapted to the above detailed step as follows. In this case, in addition to the samples discussed above also input-driven contributions are taken into account: LORs $L(i(N_o+1), j(N_o+1)), \ldots, L(i(N_o+N_i), j(N_o+N_i))$ are sampled proportionally to $\tilde{y}_L^{surf}$, where LOR $L(i, j)$ is selected with density $$d_i(i, j) = N_i \frac{\tilde{y}_{L(i,j)}^{surf}}{Y}.$$

where $N_i$ is the number of input-driven LOR samples and $Y = \Sigma_{ij} \tilde{y}_{L(i,j)}^{surf}$.

Using both input-driven and output-driven samples, i.e. apply multiple importance sampling for the detector response phase, the estimator of the detector response is:

$$\tilde{y}_{L(c_1,c_2)}^{det} \approx \varepsilon_{c_1} \varepsilon_{c_2} \sum_{s=1}^{N_i+N_o} \frac{\tilde{y}_{L(i(s),j(s))}^{surf} P_{i(s) \to c_1}(\vec{\omega}_{ij}) p_{j(s) \to c_2}(\vec{\omega}_{ij})}{d_i(i(s), j(s)) + d_o(i(s), j(s), c_1, c_2)}.$$

Herebelow, the details of a back projection are given as used in some preferred embodiments of the invention. The back projection considers the ratios of measured and estimated LOR values and executes the steps of forward projection backwards in reverse order to update the voxel estimates. As the detector response phase computes LOR values from LOR values, and the positron range phase voxel values from voxel values, their backwards execution is relatively simple. The reversed detector response operation multiplies the ratios of measured and estimated LOR values first with the detector element sensitivities and then blurs in LOR space with the detector blurring kernel.

The critical step of back projection is the geometric step, i.e. the photon transport step, since it computes LORs from voxels in forward projection, and thus voxels from LORs in back projection. As parallelization prefers output-driven algorithms, the geometric back projection must be different from the forward projection. Furthermore, the geometric back projection is essential in the iterative reconstruction algorithm but positron range and even the detector response may be skipped in this phase, making forward and back projections unmatching with respect to each other. The application of unmatched back projector can reduce the time needed by a single iteration and can improve convergence, but skipping the detector response makes the system less stable and accurate for low-dose and therefore low-statistics measurements.

The positron transport step and/or the detector response step may be also omitted or other simplified steps can be applied instead of the above detailed positron transport step and detector response step in the forward projection. The elimination of these steps result only in that the transport of the positrons and the photon transport in the detectors are not taken into account but this does not alter the type of the input and the output of the forward and back projections, namely, while both the input and output are voxel values in the positron transport step and both the input and output are detector element data in the detector response step.

In the following, voxel-driven, i.e. output driven geometric back projection will be discussed. In order to handle the sensitivity of EM reconstruction scheme to inconsistent noises, some regularization scheme is worth to apply, e.g. total variation regularization causing minor modification of voxel updates for improving the emission density data.

Geometric back projection computes the scaling factors of voxels from the ratios of measured and computed LOR values as described by the back projection equation introduced above, thus a gathering approach leads to a parallelization scheme where a thread is responsible for computing the update ratio of a single voxel from all relevant LORs.

Figure 9:
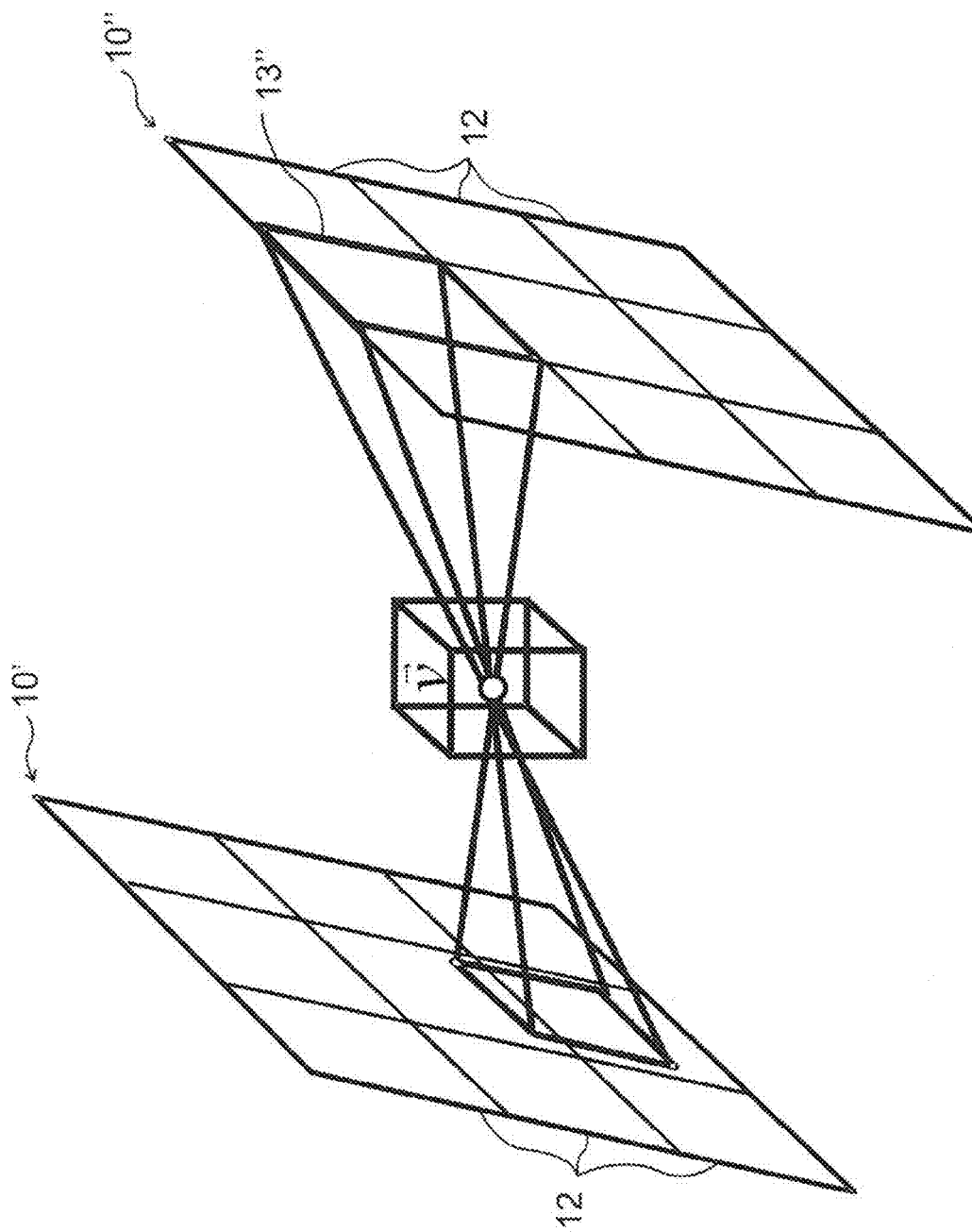
FIG. 9 shows a voxel placed between two parallel detector devices and a LOR giving contribution to the voxel.

In a thread corresponding to back projection, the elements in the column of the system matrix associated with the current voxel are estimated by taking discrete position samples inside the voxel. These sample points are generated using a basis function as the density during pre-processing and are used for each voxel. Each detector element pair is considered and the surface of detector elements on the farther detector device is projected onto the plane of the other detector element via position samples. Note that with a fixed position sample, central projection is a homogeneous linear function whose parameters need to be computed only once for every detector element pair. Central projection maps the rectangle onto another rectangle if modules are parallel and to a trapezoid if only the axial detector element edges are parallel but the tangential edges are not. Those other detector element surfaces are found to fall inside the projection, and thus form LORs for this voxel. The intersection of the surface areas of projections and detector element surfaces is used to estimate the solid angle in which the LOR can be seen from the sampling point. The above detailed situation is demonstrated in FIG. 9. The figure shows a single computational thread of the geometric back projection corresponding to LOR L, which takes point samples $\vec{v}$ and projects the surface of a detector element 13" of the farther detector device 10" onto the plane of closer detector device 10' to obtain the solid angles of LORs. The figure shows a single point sample in $\vec{v}$ and a pair of parallel detector devices 10', 10", but the thread processes all detector element pairs and all point samples associated with this voxel. If detector devices are not parallel, then the central projection of a rectangle is a trapezoid. The system matrix element can be computed from the solid angle, the length of the line segment inside the voxel, and the total attenuation of the line between two detector elements. The attenuation is primarily caused by Compton scattering. The result of the attenuation is that some of the particles scatter out from a specific LOR. The attenuation can be preferably taken into account in some embodiments of the reconstruction method according to the invention.

Note that by starting a contributing LOR for a voxel from the farther detector element, the projection of the farther detector element can cover several neighboring detector elements partly on the closer detector device. In this case the contribution of the farther detector device can be estimated by the contribution of every contributing detector elements by weighting.

The expectation maximization algorithm—used in the iteration steps in preferred embodiments of the method according to the invention—is known to be ill-conditioned, which means that enforcing the maximization of a likelihood function may result in a solution with drastic oscillations and noisy behavior. This problem can be attacked by regularization methods that include additional information (P. J. Green: Bayesian reconstructions from emission tomography data using a modified EM algorithm, *IEEE Trans. Med. Im.*, Vol. 9, pp. 84-93 (1990)), e.g. as a penalty term. An appropriate penalty term is the total variation (TV) of the solution (M. Persson, D. Bone, H. Elmqvist: Total variation norm for three-dimensional iterative reconstruction in limited view angle tomography, *Physics in Medicine and Biology*, Vol. 46, pp. 853-866 (2001)).

The accuracy of the system matrix elements used in forward projection primarily affects the accuracy of the reconstruction. System matrix elements—at least some of matrix elements of the sub-matrices—are preferably computed on-the-fly by a numerical quadrature, for which discrete random points are used as detailed above.

The method according to the invention can preferably use two types of error reduction techniques, stochastic iteration (L. Szirmay-Kalos: Stochastic iteration for non-diffuse global illumination. *Computer Graphics Forum*, Vol 18, pp. 233-244 (1999)), which is a filtering executed in the time-domain, and filtered sampling (J. Krivánek, M. Colbert: Real-time shading with filtered importance sampling. *Computer Graphics Forum*, Vol. 27, pp. 1147-1154 (2008)), which is a filtering executed in the spatial domain. Both filtering schemes improve the accuracy without essentially increasing the computation time.

Stochastic iteration uses different samples in different iteration steps making sure that the expectation of the error is zero, which results in computed LOR responses $\tilde{y}_L$ that fluctuate around their expected value, and averages recent forward projection estimates during the iteration sequence. Concerning accuracy, stochastic iteration is similar to iterating with the average of the system matrices, i.e. with the matrix that would be computed using more samples.

Figure 10:
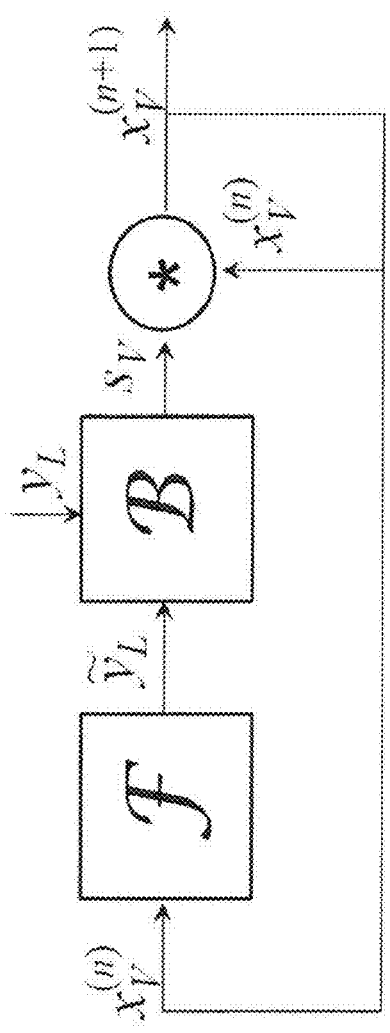
FIG. 10 represents an embodiment, where no filtered sampling is applied.
Figure 11:
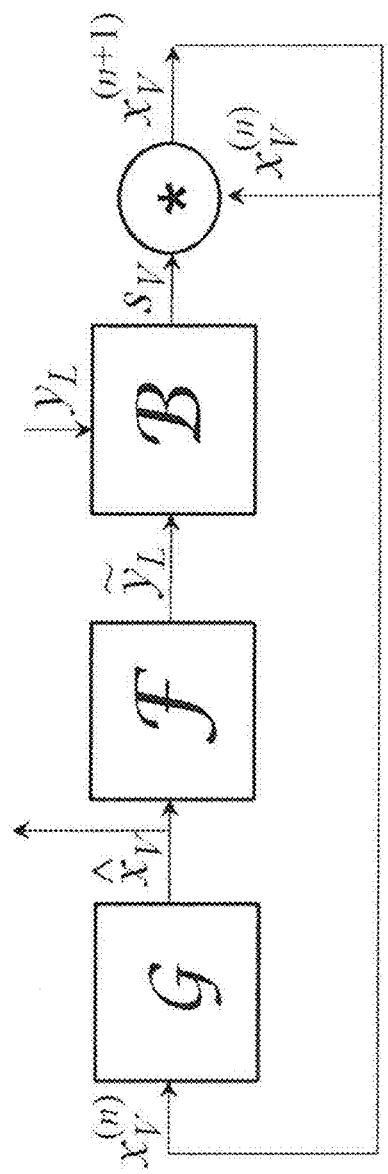
FIG. 11 represents a further embodiment with filtered sampling involved.

Turning to the other above mentioned scheme: filtered sampling replaces the integrand of forward projection by another function that has a similar integral but a smaller variation, therefore, its integral can be estimated more precisely. The control loops of classical iteration and with the application of filtered sampling are shown in FIG. 10 and FIG. 11, respectively. The figure shows that forward projection F takes the filtered voxels $\hat{x}_Y$ computed as a filtering G of the output of the back projection B. If forward projection were ideal, then this loop would stabilize when $B(F(\hat{x}))=1$, thus filtered voxel value $\hat{x}$ would be the ideal solution despite the included filtering. On the other hand, when forward projection is not ideal and the variation of its input poses problems, the variation of the input can be reduced with the added filter.

The performance of the different embodiments of the method according to the invention is demonstrated by showing some exemplary results. The presented examples are produced with the CUDA Implementation that runs on NVidia GeForce GTX 480 GPUs. The simulated or measured data have been obtained assuming a known nanoPET/CT system (NanoPET/CT in-vivo preclinical imager, 2010, http://www-.bioscan.com/molecular-imaging/nanopet-ct) that consists of twelve square detector devices or modules consisting of 81×39 crystals detectors, i.e. detector elements. The exemplary detector elements are of surface size 1.12×1.12 mm². During reconstruction, registered CT data can also be relied on, which can be used in object and material dependent positron range and attenuation/scattering computations.

Figure 12B:
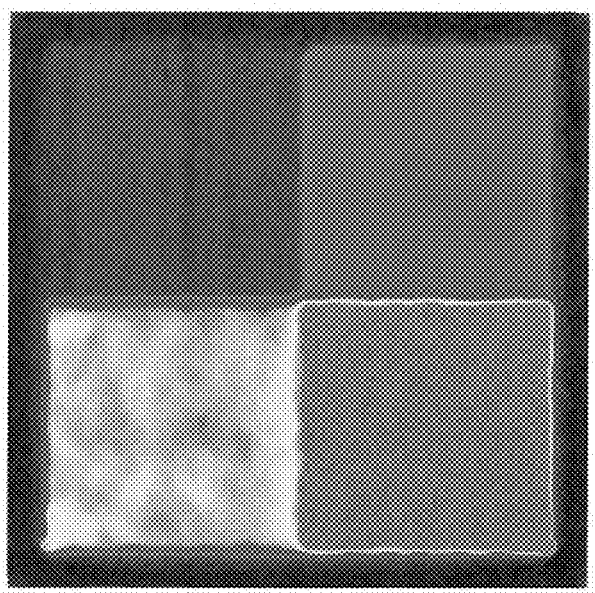
FIG. 12B shows a homogeneity phantom.
Figure 12A:
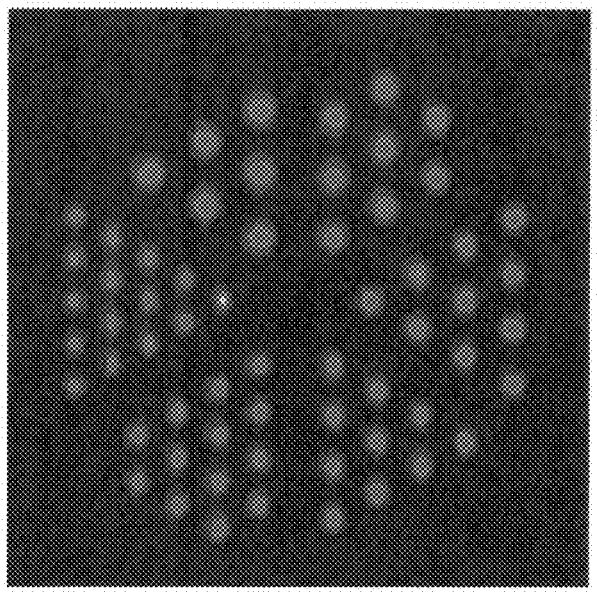
FIG. 12A shows a Derenzo phantom.

Three different mathematical phantoms are simulated by GATE (http://www.opengatecollaboration.org/) modeling the nanoPET system in order to demonstrate the performance of an embodiment of the inventive method in geometric projection: an off-axis point source phantom of 0.1 MBq activity and measured for 10 sec, a Derenzo phantom with rod diameters 1.0, 1.1, . . . , 1.5 mm in different segments, filled up with 1.6 MBq activity and simulated for 100 sec, and a homogeneity phantom that is built of 8 constant activity cubes having 0.6 MBq activity in total and simulated for 20 sec. The cross sections of the Derenzo and homogeneity phantoms are demonstrated in FIGS. 12A and 12B, respectively. The mathematical phantoms also make it possible to test and evaluate the factored steps separately. In the GATE modeling, physical effects are turned off and on to produce ideal geometric measurement and data simulating physical effects as well. In ideal geometric simulations, the LYSO crystals—i.e. the detector elements—of nanoPET/CT are replaced in the GATE by a very dense material, back-to-back gamma sources are placed in the voxels, and the phantom attenuation and scattering are turned off. In physically plausible simulations, i.e. when physical effects are taken into account, the detector model is made realistic, i.e. LYSO crystals are specified for GATE, isotope sources are defined, and attenuation and scattering are also allowed to happen. From these physical phenomena, positron range and detector response are critical in small animal PET, attenuation has a moderate effect and scattering just a minor one.

The off-axis point source is expected to favor the input-driven sampling, the homogeneity phantom the output-driven sampling, while the Derenzo is a typical case in between the two previous extreme cases.

Figure 13B:
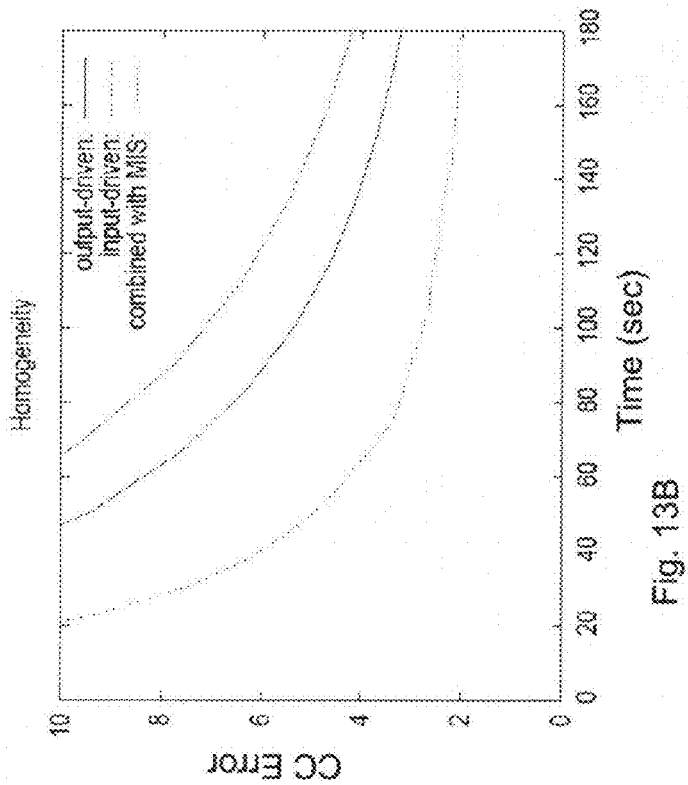
Figure 13A:
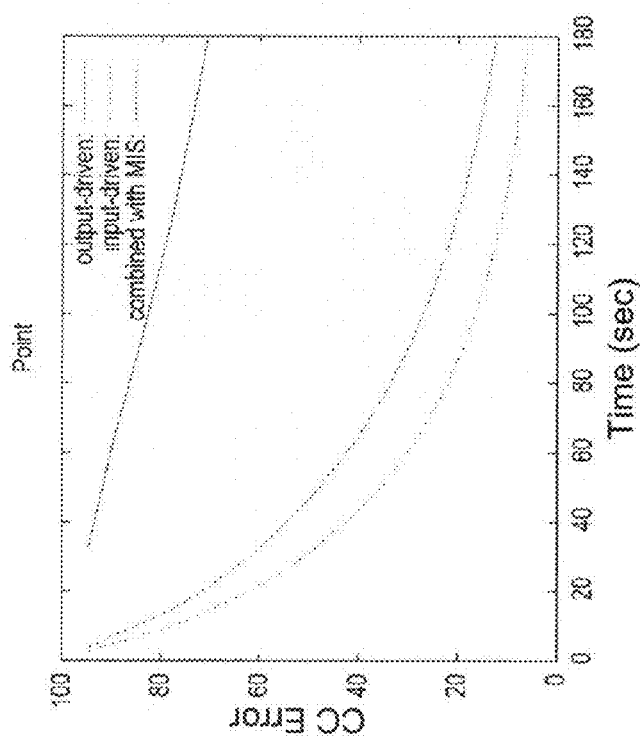

In FIGS. 13A-13C the Cross Correlation (CC) error of the reconstruction is shown as the function of the computation time for the three above introduced phantoms, respectively. The definition of CC is given at http://mathworld.wolfram.com/CorrelationCoefficient.html and denoted by r. The number r is the cross-correlation coefficient of a currently obtained reconstruction and the original phantom. The depicted quantity is the CC Error with the definition: CC Error=100*(1−|r|). A zero value of the CC Error would correspond to the exact match between them (r=1), 100% would correspond to a random guess which is not correlated with the exact result (r=0).

In FIGS. 13A-13C the performances of fully output-driven and fully input-driven embodiments are compared to an embodiment combining the output-driven and input-driven schemes (Multiple Importance Sampling). In FIGS. 13A-13C the data corresponding to output-driven, input-driven and combined schemes are denoted by continuous, long-dashed and short-dashed lines, respectively. For the different phantoms, different parameters are used in the different embodiments of the reconstructions. For the point phantom depicted in FIG. 13A, $N_{detline}=20$, $N_{march}=99$ for the fully output-driven scheme, $N_v=10^5$ for the fully input-driven scheme, and $N_{detline}=4$. $N_{march}=25$ and $N_v=10^4$ for the combined scheme. For the Derenzo phantom depicted in FIG. 13B, $N_{detline}=6$, $N_{march}=72$ for the fully output-driven scheme, $N_v=10^6$ for the fully input-driven scheme, and $N_{detline}=4$, $N_{march}=36$ and $N_v=10^4$ for the combined scheme.

For the homogeneity phantom depicted in FIG. 13C, $N_{detline}=2$, $N_{march}=54$ for the fully output-driven scheme, $N_v=106$ for the fully input-driven scheme, and $N_{detline}=1$, $N_{march}=36$ and $N_v=10^5$ for the combined scheme. Note that for the fully output-driven algorithms $N_v=0$ and for fully input-driven algorithms $N_{detline}=0$ and $N_{march}=0$ always hold.

The following general consequences can be drawn based on the calculations of the various embodiments. As expected, the fully input-driven approach can perform better than the only output-driven scheme only for the point phantom, while the fully output-driven approach is better than the input-driven one for the homogeneity phantom and the Derenzo phantom. However, for all three phantoms, both of the above embodiments, i.e. the fully input-driven, as well as the fully output-driven, can be outperformed by the above proposed combined method, i.e. the embodiment of the inventive method which preferably applies multiple importance sampling. By the application of the combined method, the number of line samples $N_{detline}$ and the number of steps $N_{march}$ can be reduced, and relatively few $N_v$ volume points should be added to compensate the missing samples at important regions. Note that for about $10^6$ voxels, $10^4$ added volume samples seem satisfactory. The reason is that at high activity, point like features, a few samples can result in accurate projections, while at larger homogeneous regions, the output-driven method already does a fairly good job, which is not compromised by the added rare volume samples. The random selection and projection of $10^4$ volume samples onto 180 million LORs needs just 0.3 seconds on the GPU, which is negligible with respect to the times of other processing steps.

Figure 14B:
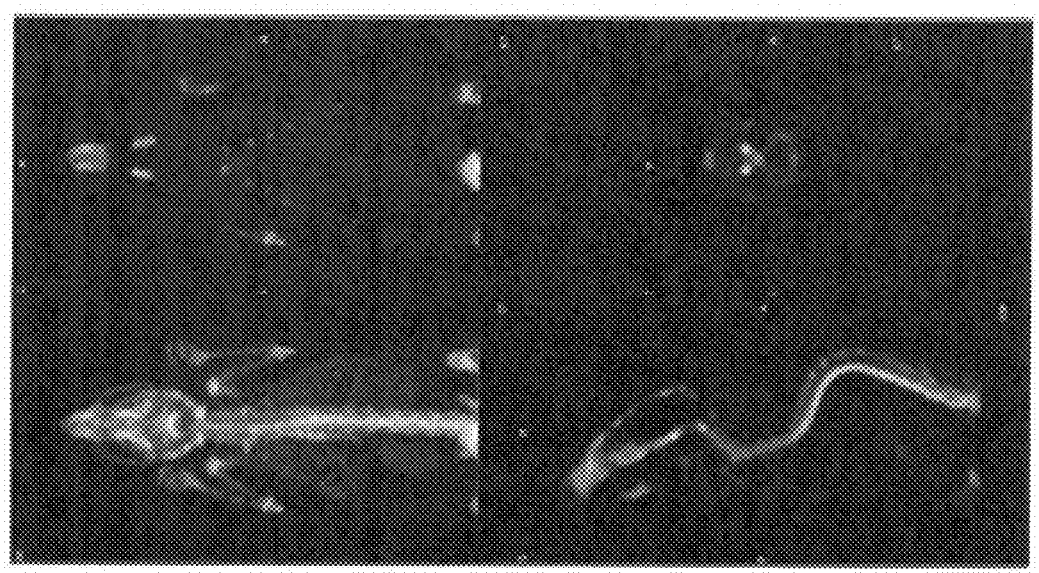
FIGS. 14A and 14B show a reconstruction result for an animal obtained by various embodiments of the method according to the invention.
Figure 14A:
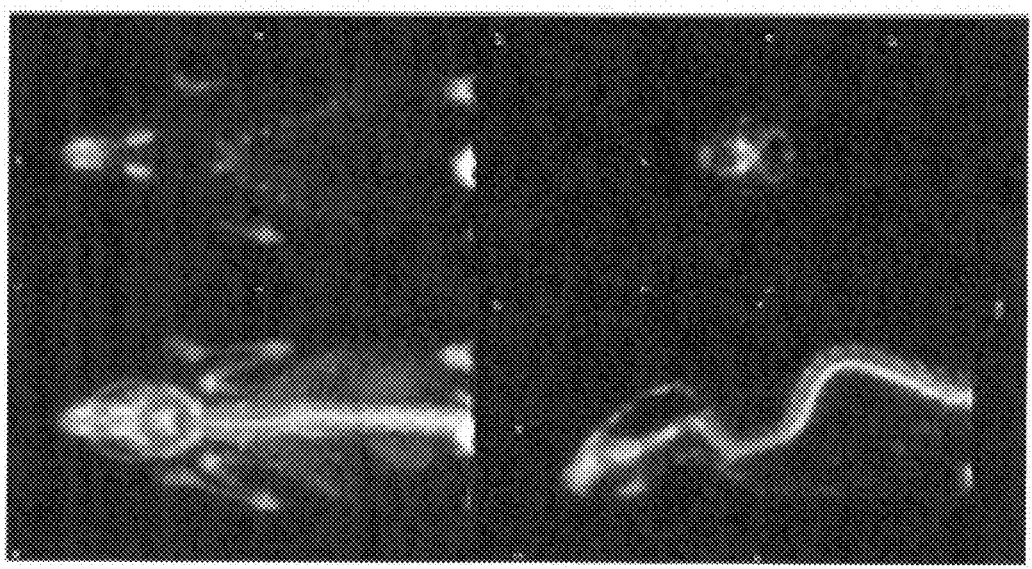

FIGS. 14A and 14B demonstrate the reconstruction result of a physical measurement taken by a known nanoPET/CT system. Here the target resolution is 324×315×315 voxels. The difference of the reconstruction methods performed for obtaining FIGS. 14A and 14B is that the result shown in FIG. 14A is obtained by an embodiment of the invention comprising the above detailed photon transport step but not comprising the above detailed detector response step, while both that photon transport and detector response steps are utilized for the reconstruction result shown in FIG. 14B. $N_{detline}=4$ Poisson-disk distributed line samples per LOR are used, $N_{march}=162$ point samples per line in LOR-driven forward projection and $N_v=10^5$ volume point samples in voxel-driven forward projection, which are combined with multiple importance sampling for both of FIGS. 14A and 14B. For reconstructing the data shown by 14B, the detector response was computed with 64 output-driven samples in forward projection. In the example shown in FIG. 14B, the forward and back projections are unmatching since in the detector response step of the back projection a simplified detector model is used which is proposed in M. Magdics, B. Tóth, L. Szécsi, B. Csébfalvi, L. Szirmay-Kalos, Á. Szlavecz, G. Hesz, B. Benyó, Á. Cserkaszky, D. Légrády, Sz. Czifrus, A. Wirth, B. Kári, J. Lantos, G. Patay, D. Völgyes, P. Major, G. Németh. T. Bükki, and B. Domonkos: Detector modeling techniques for pre-clinical 3D PET reconstruction on the GPU, in: *The 11th International Meeting on Fully Three-Dimensional Image Reconstruction in Radiology and Nuclear Medicine*, pp. 375-8 (2011). In the reconstruction of FIG. 14A the above simplified detector model is used both in the forward and back projections. Gaussian filtering is applied to the reconstructed volume between iteration steps with standard deviation equal to the double of the linear size of a voxel. Stochastic iteration was also turned on after the fifth iteration step, i.e. took statistically independent sets of random samples and computed the average of expected LOR hits. Total variation regularization is applied during the iteration. The positron transport step is not carried out in the reconstruction of the FIGS. 14A and 14B.

TABLE 1

|  | EM | | OSEM, 6 subsets | |
| --- | --- | --- | --- | --- |
| Factored step | $128^3$ | $256^3$ | $128^3$ | $256^3$ |
| Positron range with 3 materials | 0.6 sec | 2 sec | 0.6 sec | 2 sec |
| Geometric FP (4 line samples) | 7 sec | 58 sec | 1 sec | 9 sec |
| Geometric BP (1 point sample per voxel) | 12 sec | 90 sec | 2 sec | 15 sec |
| LOR filtering (64 samples) | 9 sec | 9 sec | 1.4 sec | 1.4 sec |
| Total | 29 sec | 159 sec | 5 sec | 27 sec |

Table 1 presents the execution times of the factored steps needed to execute a single EM (Expectation Maximization) iteration and to process a subset in OSEM (Ordered Subset Expectation Maximization), when reconstruction is performed at $128^3$ and $256^3$ voxel resolutions, respectively. The illustrated reconstruction times correspond to an unmatched back projection scheme, i.e. detector response simulation and positron range simulation are not taken into account in the course of the back projection. Note that the geometric back projection takes longer than forward projection and dominates the computation time, which is due to the fact that the voxel driven, i.e. output-driven, back projection visits all relevant LORs for each voxel in a thread, but the LOR data structure is essentially a four-dimensional array (an array element is identified by the four indices of the four spatial coordinates determines a certain LOR) which cannot be as efficiently placed in textures as 3D voxels. Unlike geometric back projection, forward projection is LOR driven in connection with the data shown in the table, i.e. similarly output-driven as the back projection. In a LOR driven forward projection all relevant voxels are accessed for each LOR in a thread, and the 3D texture cache can be highly utilized.

If further speed-ups are needed, more than one GPU card can be used. In a multi-GPU solution, a single GPU card maintains just a portion of the voxel array and computes the geometric forward and back projections as if only these voxels existed. Between the forward and back projections, LOR images are exchanged and every GPU adds the LOR values of other cards to its own result. This multi-GPU parallelization linearly speeds up geometric forward and back projections and its overhead is only the time needed for the exchange and the addition of the computed LOR values.

Scattering and random effects can be handled additively as described in M. Magdics, L. Szirmay-Kalos, B. Tóth, A. Csendesi, and A. Penzov: Scatter estimation for PET reconstruction, in: *Proceedings of the 7th international conference on Numerical methods and applications*, NMA '10, Springer-Verlag, Berlin, Heidelberg, pp. 77-86 (2011). The simulated factors are addressed one by one, and for each of them, a GPU optimized solution is found from the alternatives of on-the-fly computation, Monte Carlo estimation, and the usage of pre-computed, measured or simulated data.

The invention is, of course, not limited to the preferred embodiments described in details above, but further versions, modifications and developments are possible within the scope of protection defined by the claims.

The invention claimed is:

1. A method for tomographic reconstruction from measurement data, the method comprising the steps of:
   obtaining the measurement data corresponding to activity of particle emissions of a volume from a tomographic imaging system;
   performing at least one iteration step to obtain emission density data of particle emissions of the volume from the measurement data, wherein the at least one iteration step comprises:
      a forward projection being a projection from the emission density data to the measurement data; and
      a back projection being to a projection from the measurement data to the emission density data;
   wherein the at least one iteration step is carried out in a parallel hardware architecture;
   wherein the measurement data is of binned type;
   wherein both the forward projection and the back projection are of partly gathering type; and
   wherein the forward projection comprises:
      a photon transport step for describing photon propagation from a point of origination of the photon to a surface of a detector element;
      a detector evaluation step for describing photon propagation from the surface of the detector element to an output of detection; and
      wherein the photon transport step and/or the detector evaluation step are of partly scattering type.

2. The method according to claim 1 wherein the measurement data is obtained from a signal of a detector device comprising a plurality of the detector elements, wherein the measurement data and the emission density data are connected by a system matrix, and wherein the system matrix is factorized into sub- matrices according to the photon transport step and the detector evaluation step.

3. The method according to claim 2 wherein the detector evaluation step comprises:
   a detector blurring step for describing photon propagation from the surface a detector element to absorption of the photon; and
   a detector measurement step for describing an evaluation from the absorption of the photon to the output of detection, wherein the system matrix is factorized into sub-matrices also according to the detector blurring step and the detector measurement step.

4. The method according to claim 3 wherein the pre-generated samples are used in the detector blurring step, and wherein the pre-generated samples are based on a Monte Carlo simulation.

5. The method according to claim 4 wherein each detector element includes a detector sensitivity value for handing crystal sensitivity of the detector elements and electronics connected to the detector elements.

6. The method according to claim 5 wherein the method is for positron emission tomography, and the forward projection comprises:
   a positron transport step for describing propagation of a positron from a point of origination to a point of annihilation into a pair of photons; and
   the system matrix is factorized into sub-matrices also according to the positron transport step.

7. The method according to claim 6 wherein at least some of matrix elements of the sub-matrices of the system matrix are computed on-the-fly.

8. The method according to claim 7 wherein the forward projection and the back projection are unmatching with respect to each other.

9. The method according to claim 8 wherein the parallel hardware architecture is at least one graphic processing unit comprising a plurality of scalar processors.

10. The method according to claim 9 wherein the parallel architecture comprises parallel threads and at least a part of the threads has identical control path.

11. The method according to claim 10 wherein at least a part of the steps algorithms corresponding to the step are carried out in parallel threads being of identical length.

12. The method according to claim 11 wherein in the forward projection a filtering is executed in time-domain and/or spatial domain.

13. The method according to claim 12 wherein a regularization scheme is applied in back projection for improving the emission density data.

14. The method according to claim 1 wherein the detector evaluation step comprises:
   a detector blurring step for describing photon propagation from the surface a detector element to absorption of the photon; and
   a detector measurement step for describing an evaluation from the absorption of the photon to the output of detection, wherein the system matrix is factorized into sub-matrices also according to the detector blurring step and the detector measurement step.

15. The method according to claim 1 wherein the pre-generated samples are used in the detector blurring step, and wherein the pre-generated samples are based on a Monte Carlo simulation.

16. The method according to claim 1 wherein each detector element includes a detector sensitivity value for handing crystal sensitivity of the detector elements and electronics connected to the detector elements.

17. The method according to claim 1 wherein the method is for positron emission tomography, and the forward projection comprises:
   a positron transport step for describing propagation of a positron from a point of origination to a point of annihilation into a pair of photons; and
   the system matrix is factorized into sub-matrices also according to the positron transport step.

18. The method according to claim 1 wherein at least some of matrix elements of the sub-matrices of the system matrix are computed on-the-fly.

19. A non-transitory computer readable medium comprising a computer readable program for processing tomographic reconstruction from measurement data, wherein the computer readable program when executed on a computer causes the computer to perform the steps of the method according to claim 1.

20. A system for processing tomographic reconstruction from measurement data, the system comprising:
   an obtaining unit for obtaining the measurement data corresponding to activity of particle emissions of a volume from a tomographic imaging system; wherein the measurement data is of binned type;
   an iteration unit for performing at least one iteration step to obtain emission density data of particle emissions of the volume from the measurement data, wherein the iteration unit comprises:
      a parallel hardware architecture;
      a forward projection unit for performing a forward projection for projecting the emission density data to the measurement data; and
      a back projection unit for performing a back projection for projecting the measurement data to the emission density data;

wherein the forward projection and the back projection are of partly gathering type; and wherein the forward projection comprises:
- a photon transport step for describing photon propagation from a point of origination of the photon to a surface of a detector element;
- a detector evaluation step for describing photon propagation from the surface of the detector element to an output of detection; and
- wherein the photon transport step and/or the detector evaluation step are of partly scattering type.

* * * * *